(12) United States Patent
Van Nee et al.

(10) Patent No.: US 9,735,846 B2
(45) Date of Patent: Aug. 15, 2017

(54) COMMUNICATION DEVICES FOR MULTIPLE GROUP COMMUNICATIONS

(71) Applicant: QUALCOMM Incorporated, San Diego, CA (US)

(72) Inventors: Didier Johannes Richard Van Nee, De Meern (NL); Albert Van Zelst, Woerden (NL); Sameer Vermani, San Diego, CA (US); Vincent Knowles Jones, IV, Redwood City, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/637,309

(22) Filed: Mar. 3, 2015

(65) Prior Publication Data

US 2015/0180560 A1 Jun. 25, 2015

Related U.S. Application Data

(62) Division of application No. 13/299,579, filed on Nov. 18, 2011.
(Continued)

(51) Int. Cl.
*H04B 7/04* (2017.01)
*H04B 7/0452* (2017.01)
*H04B 7/06* (2006.01)

(52) U.S. Cl.
CPC ......... *H04B 7/0452* (2013.01); *H04B 7/0434* (2013.01); *H04B 7/0615* (2013.01);
(Continued)

(58) Field of Classification Search
CPC .. H04B 7/0434; H04B 7/0452; H04B 7/0615; H04B 7/0617; H04B 7/0626; H04B 7/0697
(Continued)

(56) References Cited

U.S. PATENT DOCUMENTS 7,423,989 B2 9/2008 Hansen et al.
7,688,899 B2 3/2010 Ketchum et al.
(Continued)

FOREIGN PATENT DOCUMENTS

CN 101662322 A 3/2010
CN 101789849 A 7/2010
(Continued)

OTHER PUBLICATIONS

Spencer Q.H., et al., "Zero-Forcing Methods for Downlink Spatial Multiplexing in Multiuser MIMO Channels," IEEE Transactions on Signal Processing, Feb. 2004, vol. 52, No. 2, pp. 461-471.
(Continued)

*Primary Examiner* — Stephen J Clawson
(74) *Attorney, Agent, or Firm* — Austin Rapp & Hardman

(57) ABSTRACT

A base station for communicating with multiple groups of wireless communication devices is described. The base station includes a processor and executable instructions stored in memory that is in electronic communication with the processor. The base station determines a number of wireless communication devices. The base station also splits the number of wireless communication devices into groups. The base station further determines a precoding matrix for each group. The base station additionally transmits a beamformed signal to each group using the precoding matrix for each group.

16 Claims, 13 Drawing Sheets

Related U.S. Application Data

(60) Provisional application No. 61/494,626, filed on Jun. 8, 2011.

(52) U.S. Cl.
CPC ......... *H04B 7/0617* (2013.01); *H04B 7/0626* (2013.01); *H04B 7/0697* (2013.01)

(58) Field of Classification Search
USPC ........................................................ 370/329
See application file for complete search history.

(56) References Cited

U.S. PATENT DOCUMENTS

| | | | |
|---|---|---|---|
| 7,804,800 B2 | 9/2010 | Li et al. | |
| 8,615,052 B2 | 12/2013 | Gomadam et al. | |
| 8,699,633 B2 | 4/2014 | Erell et al. | |
| 8,750,404 B2 | 6/2014 | Gomadam et al. | |
| 2006/0239366 A1 | 10/2006 | Kim et al. | |
| 2006/0274680 A1* | 12/2006 | Zhu | H04W 28/10 370/278 |
| 2009/0279486 A1 | 11/2009 | Kishigami et al. | |
| 2009/0279500 A1* | 11/2009 | Luo | H04L 5/0053 370/330 |
| 2009/0286562 A1* | 11/2009 | Gorokhov | H04B 7/0617 455/501 |
| 2010/0054223 A1 | 3/2010 | Zhang et al. | |
| 2010/0255852 A1 | 10/2010 | Chen et al. | |
| 2010/0316094 A1 | 12/2010 | Tung | |
| 2011/0002219 A1 | 1/2011 | Kim et al. | |
| 2011/0032875 A1 | 2/2011 | Erceg et al. | |
| 2011/0205930 A1* | 8/2011 | Rahman | H04B 7/0417 370/252 |
| 2011/0280188 A1 | 11/2011 | Jeon et al. | |
| 2012/0281554 A1* | 11/2012 | Gao | H04W 48/12 370/252 |
| 2012/0315938 A1 | 12/2012 | Van Nee et al. | |
| 2014/0105110 A1* | 4/2014 | Hoshino | H04W 52/18 370/328 |
| 2014/0126476 A1* | 5/2014 | Kang | H04L 1/0026 370/328 |

FOREIGN PATENT DOCUMENTS

| | | |
|---|---|---|
| JP | 2006319959 A | 11/2006 |
| JP | 2010028737 A | 2/2010 |
| JP | 2010521873 A | 6/2010 |
| WO | 02093779 | 11/2002 |
| WO | 2009002269 A1 | 12/2008 |
| WO | 2009088225 A2 | 7/2009 |
| WO | 2010042234 | 4/2010 |
| WO | 2010050874 A1 | 5/2010 |

OTHER PUBLICATIONS

International Search Report and Written Opinion—PCT/US2011/061645—ISA/EPO—Feb. 14, 2012.
Masouros C., et al., "A Transmitter-Based Beamforming Scheme for the MIMO Downlink Employing Adaptive Channel Decomposition", Wireless Communications and Networking Conference (WCNC), 2010 IEEE, IEEE, Piscataway, NJ, USA, Apr. 18, 2010 (Apr. 18, 2010), pp. 1-5, XP031706487, ISBN: 978-1-4244-6396-1 Chapter 11; p. 2.

* cited by examiner

COMMUNICATION DEVICES FOR MULTIPLE GROUP COMMUNICATIONS

RELATED APPLICATIONS

This application is a divisional application of U.S. patent application Ser. No. 13/299,579, entitled "COMMUNICATION DEVICES FOR MULTIPLE GROUP COMMUNICATIONS", filed Nov. 18, 2011, which is related to and claims priority from U.S. Provisional Patent Application Ser. No. 61/494,626, entitled "COMMUNICATION DEVICES FOR MULTIPLE GROUP COMMUNICATIONS", filed Jun. 8, 2011, which are incorporated herein by reference in their entirety.

TECHNICAL FIELD

The present disclosure relates generally to communication systems. More specifically, the present disclosure relates to communication devices for multiple group communications.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless networks using such communication devices.

As the use of communication devices has increased, advancements in communication device capacity are being sought. Systems and methods that improve communication device capacity may be beneficial.

SUMMARY

The systems and methods disclosed herein may allow multi-user multiple input and multiple output (MU-MIMO) to multiple groups. In accordance with the systems and methods disclosed herein, for example, the number of downlink wireless communication devices (e.g., clients) may be split into groups of four or fewer in the case of resolvable LTFs or into groups of eight or fewer in the case of unresolvable LTFs. For instance, a base station (e.g., access point) may beamform to multiple groups simultaneously such that the omnidirectional part of the preambles are beamformed. In this way, each group may only "see" signaling relevant to that group. Furthermore, wireless communication devices (e.g., clients) within one group may receive reduced or minimal interference from transmissions to another group. Within one group, the base station (e.g., access point) may use resolvable LTFs and some form of eigenmode selection (e.g., minimum mean-square error (MMSE)-eigenmode selection (MMSE-ES) or multi-user eigenmode transmission (MET)) such that wireless communication devices (e.g., clients) within a group receive signals intended for all wireless communication devices (e.g., clients) in the same group.

A base station for communicating with multiple groups of wireless communication devices is disclosed. The base station includes a processor and instructions stored in memory that is in electronic communication with the processor. The base station determines a number of wireless communication devices. The base station also splits the number of wireless communication devices into groups. The base station additionally determines a precoding matrix for each group. Furthermore, the base station transmits a beamformed signal to each group using the precoding matrix for each group. The base station may also receive channel information. The base station may also use media access control protection.

Determining the precoding matrix for each group may be performed for beamforming an omnidirectional part of a preamble. The precoding matrix for a current group may be applied to a first part of a preamble and the base station may also determine a second precoding matrix for the current group that is applied to a second part of the preamble.

Determining the precoding matrix for each group may also include determining a group channel for a current group and determining a complement group channel. Determining the precoding matrix for each group may also include determining a complement group channel null space. Determining the precoding matrix for each group may further include determining a client channel for each wireless communication device in the current group and determining a precoding matrix for the current group based on the client channel and the complement group channel null space for each wireless communication device.

Determining the complement group channel null space may be accomplished according to an equation $[U', S', V']=svd(H'_k)$. $H'_k$ may be the complement group channel. $U'$ may include left singular vectors of $H'_k$. $S'$ may be singular values of $H'_k$. $V'$ may include right singular vectors of $H'_k$. svd( ) may be a singular value decomposition function. The complement group channel null space $V_n$ may include the last $N_{tx}-(N_{rxr}-N_{rxk})$ columns of $V'$. $N_{tx}$ may be a number of base station transmitters. $N_{rxt}$ may be a total number of wireless communication device receivers and $N_{rxk}$ may be a total number of receivers in a group k.

Determining the precoding matrix for the current group may be accomplished according to equations $[U_m, S_m, V_m]=svd(H_{mk}V_n)$ and $W_k(:,m)=V_m(:,1)S_m^{-1}(1,1)$. $H_{mk}$ may be the client channel. $V_n$ may be the complement group channel null space. $U_m$ may include left singular vectors of $H_{mk}V_n$. $S_m$ may be singular values of $H_{mk}V_n$. $V_m$ may include right singular vectors of $H_{mk}V_n$. svd( ) may be a singular value decomposition function. $W_k$ may be the precoding matrix for a group k and m may be an index number.

Determining the precoding matrix for the current group may be accomplished according to equations $$[U_m, S_m, V_m] = svd(H_{mk}V_n),$$

$$Z(:, (m-1)N_{ssmk}+1:m*N_{ssmk}) = V_m(:, 1:N_{ssmk})S_m(1:N_{ssmk}, 1:N_{ssmk})$$

and $$W_{km} = \left(ZZ^H + \left(\frac{1}{SNR_k}\right)I\right)^{-1}Z.$$

$H_{mk}$ may be the client channel. $V_n$ may be the complement group channel null space. $U_m$ may include left singular vectors of $H_{mk}V_n$. $S_m$ may be singular values of $H_{mk}V_n$. $V_m$ may include right singular vectors of $H_{mk}V_n$. svd( ) may be a singular value decomposition function. $N_{ssmk}$ may be a number of spatial streams of a wireless communication device m in a group k. Z may be a matrix comprising selected eigenmodes. Superscript $^H$ may denote a conjugate transpose. I may be an identity matrix. $SNR_k$ may be an estimate of average signal-to-noise ratio (SNR) in downlink for the group k. $W_{km}$ may be the precoding matrix.

Determining the precoding matrix for the current group may be accomplished according to equations $$[U_m, S_m, V_m] = svd(H_{mk}V_n),$$

$$D_m = V_m(:, 1:N_{ssmk})S_m(1:N_{ssmk}, 1:N_{ssmk}, 1:N_{ssmk}),$$

$$Z = [D_1 D_{m-1} D_{m+1} D_{N_{ck}}]^H, [U_{mz}, S_{mz}, V_{mz}] = svd(Z),$$

$$[U, S, V] = svd(D_m^H V_{mz}(:, N_{ssk} - N_{ssmk} + 1:N_{ssk}))$$

and $$W_{km} = V_{mz}(:, N_{ssk} - N_{ssmk})V\left(\left(\frac{I_{N_{ssmk}}}{SNR_k}\right) + S\right)^{-1}.$$

$H_{mk}$ may be the client channel. $V_n$ may be the complement group channel null space. $U_m$ may include left singular vectors of $H_{mk}V_n$. $S_m$ may be singular values of $H_{mk}V_n$. $V_m$ may include right singular vectors of $H_{mk}V_n$. svd( ) may be a singular value decomposition function. $N_{ssmk}$ may be a number of spatial streams of a wireless communication device m in a group k. $D_m$ may be a steering vector for the wireless communication device m. Z may be a matrix of steering vectors to all wireless communication devices in the group k besides the wireless communication device m. Superscript $^H$ may denote a conjugate transpose. $N_{ck}$ may be a number of wireless communication devices in the group k. $U_{mz}$ may include left singular vectors of Z. $S_{mz}$ may be singular values of Z. $V_{mz}$ may include right singular vectors of Z. U may include left singular vectors of $D_m^H V_{mz}$ (:, $N_{ssk}-N_{ssmk}+1:N_{ssk}$). S may be singular values of $D_m^H V_{mz}$ (:, $N_{ssk}-N_{ssmk}+1:N_{ssk}$). V may include right singular vectors of $D_m^H V_{mz}$(:, $N_{ssk}-N_{ssmk}+1:N_{ssk}$). $N_{ssk}$ may be a number of spatial streams for the group k. $I_{N_{ssmk}}$ may be an identity matrix with $N_{ssmk}$ rows and columns. $SNR_k$ may be an estimate of average signal-to-noise ratio (SNR) in downlink for the group k. $W_{km}$ may be the precoding matrix.

The base station may additionally send multiple channel state information requests using at least one common antenna for different channel state information requests to a same wireless communication device. The base station may also receive multiple channel state information messages from the same wireless communication device and combine the multiple channel state information messages.

Determining the precoding matrix for the current group may be accomplished by setting $H_{ck}$ to $V_c''(:, 1:N_{ssck})^H$. $H_{ck}$ may be a channel for a wireless communication device c in a group k. $V_c''$ may be a beamforming matrix for the wireless communication device c. $N_{ssck}$ may be a number of spatial streams for the wireless communication device c in the group k. Superscript $^H$ may denote a conjugate transpose.

Determining the precoding matrix for the current group may be accomplished by setting $H_{ck}$ to $S_c''(1: N_{ssck}, 1: N_{ssck})V_c''(:, 1: N_{ssck})^H$. $H_{ck}$ may be a channel for a wireless communication device c in a group k. $V_c''$ may be a beamforming matrix for the wireless communication device c. $S_c''$ may be singular values for the wireless communication device c. $N_{ssck}$ may be a number of spatial streams for the wireless communication device c in the group k. Superscript $^H$ may denote a conjugate transpose.

A wireless communication device for receiving a group signal is also disclosed. The wireless communication device includes a processor and instructions stored in memory that is in electronic communication with the processor. The wireless communication device receives a group signal. The group signal includes information for two or more wireless communication devices. The wireless communication device also recovers data for the wireless communication device from the group signal using spatial filtering.

The wireless communication device may also receive a plurality of channel information requests. The wireless communication device may further determine channel information for each of the channel information requests. Additionally, the wireless communication device may send the channel information. The wireless communication device may also receive a clear to send (CTS) signal and wait a predetermined amount of time before transmitting a signal.

The data may be recovered using spatial filtering according to an equation $U_c^H S_c''^{-1}(1: N_{ssck}, 1: N_{ssck})*U_c''^H$. $U_c$ may be $U_m$ that includes left singular vectors of $H_{mk}V_n$ for the wireless communication device m=c. $H_{mk}$ may be a client channel. $V_n$ may be a complement group channel null space. $S_c''$ may be singular values of $H_{ck}$. $H_{ck}$ may be a channel for the wireless communication device c. $N_{ssck}$ may be a number of spatial streams for the wireless communication device c in group k. $U_c''$ may include left singular vectors of $H_{ck}$. Superscript $^H$ may denote a conjugate transpose.

The data may be recovered using spatial filtering according to an equation $U_c^H * U_c''^H$. $U_c$ may be $U_m$ that includes left singular vectors of $H_{mk}V_n$ for the wireless communication device m=c. $H_{mk}$ may be a client channel. $V_n$ may be a complement group channel null space. $H_c''$ may include left singular vectors of $H_{ck}$. $H_{ck}$ may be a channel for the wireless communication device c. Superscript $^H$ may denote a conjugate transpose.

A method for communicating with multiple groups of wireless communication devices by a base station is also disclosed. The method includes determining a number of wireless communication devices. The method also includes splitting the number of wireless communication devices into groups. The method further includes determining a precoding matrix for each group. The method additionally includes transmitting a beamformed signal to each group using the precoding matrix for each group.

A method for receiving a group signal by a wireless communication device is also disclosed. The method includes receiving a group signal, wherein the group signal includes information for two or more wireless communication devices. The method also includes recovering data for the wireless communication device from the group signal using spatial filtering.

A computer-program product for communicating with multiple groups of wireless communication devices is also disclosed. The computer-program product includes a non-transitory tangible computer-readable medium with instructions. The instructions include code for causing a base station to determine a number of wireless communication devices. The instructions also include code for causing the base station to split the number of wireless communication devices into groups. The instructions further include code for causing the base station to determine a precoding matrix for each group. The instructions additionally include code for causing the base station to transmit a beamformed signal to each group using the precoding matrix for each group.

A computer-program product for receiving a group signal is also disclosed. The computer-program product includes a non-transitory tangible computer-readable medium with instructions. The instructions include code for causing a wireless communication device to receive a group signal. The group signal includes information for two or more wireless communication devices. The instructions also include code for causing the wireless communication device to recover data for the wireless communication device from the group signal using spatial filtering.

An apparatus for communicating with multiple groups of wireless communication devices is also disclosed. The apparatus includes means for determining a number of wireless communication devices. The apparatus also includes means for splitting the number of wireless communication devices into groups. The apparatus further includes means for determining a precoding matrix for each group. The apparatus additionally includes means for transmitting a beamformed signal to each group using the precoding matrix for each group.

An apparatus for receiving a group signal is also disclosed. The apparatus includes means for receiving a group signal. The group signal includes information for two or more wireless communication devices. The apparatus also includes means for recovering data for a wireless communication device from the group signal using spatial filtering.

DETAILED DESCRIPTION

Figure 1:
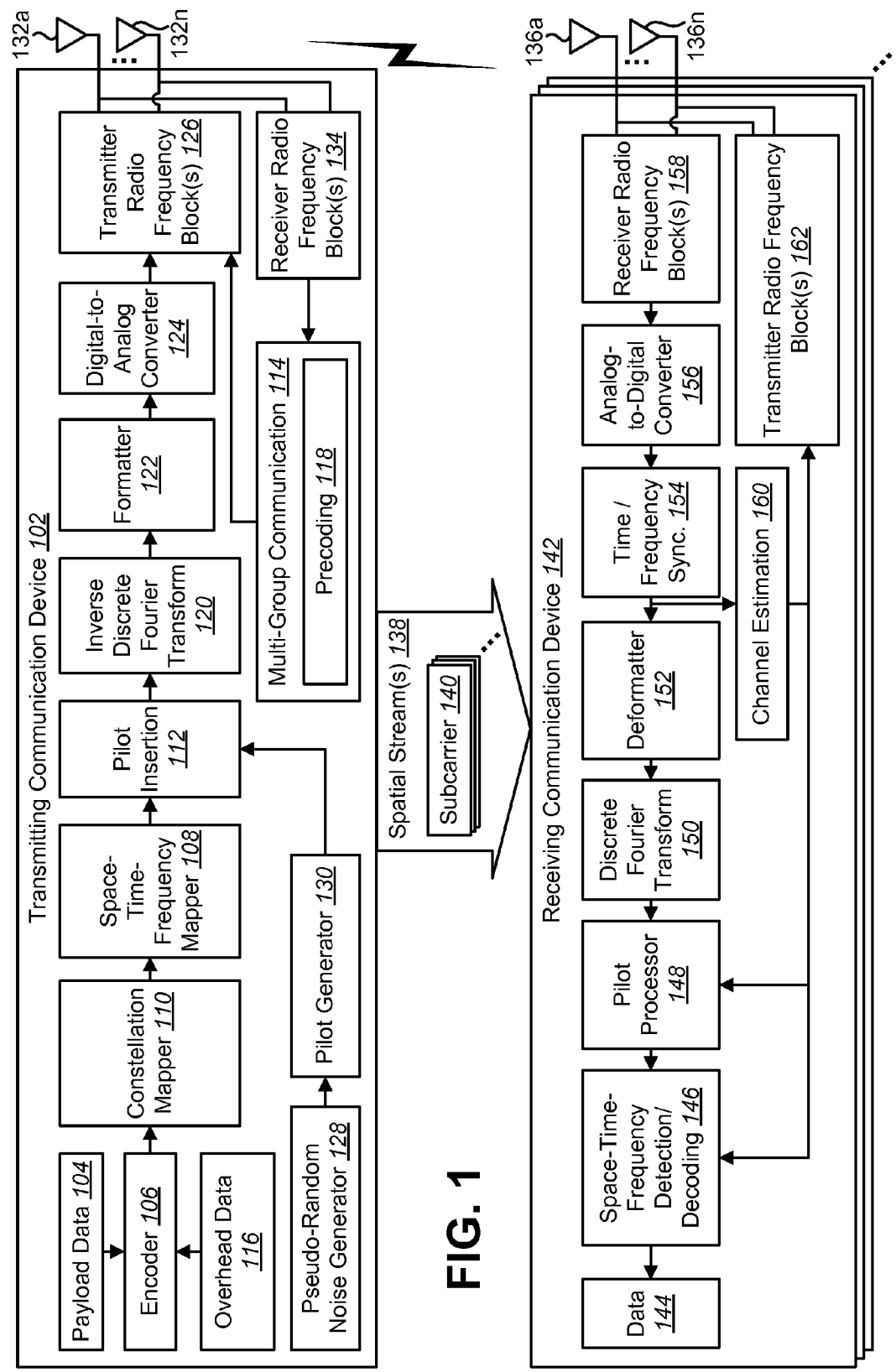
FIG. 1 is a block diagram illustrating one configuration of a transmitting communication device and one or more receiving communication devices in which systems and methods for multiple group communications may be implemented.

Examples of communication devices include cellular telephone base stations or nodes, access points, wireless gateways and wireless routers. A communication device may operate in accordance with certain industry standards, such as the Institute of Electrical and Electronics Engineers (IEEE) 802.11a, 802.11b, 802.11g, 802.11n and/or 802.11ac (e.g., Wireless Fidelity or "Wi-Fi") standards. Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE) and others (e.g., where a communication device may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipments (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment (UE), remote terminal, access point, base station, Node B, evolved Node B (eNB), etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

The systems and methods disclosed herein describe downlink multi-user multiple input and multiple output (MU-MIMO) to multiple groups. For example, IEEE 802.11ac is in the process of standardizing MU-MIMO to a group of up to four wireless communication devices. Some proposals for downlink MU-MIMO limit the number of wireless communication devices (e.g., clients) within a downlink transmission to four. Limiting the number of wireless communication devices to four, the gain of downlink MU-MIMO is limited. However, the systems and methods disclosed herein demonstrate how a communication device (e.g., base station or access point) with enough transmit antennas could transmit downlink MU-MIMO packets to more wireless communication devices (e.g., clients) than foreseen by these proposals. In accordance with the systems and methods disclosed herein, a base station (e.g., access point) may transmit to multiple groups of wireless communication devices (e.g., clients, access terminals, etc.) at the same time (e.g., simultaneously) while reducing or minimizing interference between the groups. Within each group, the base station may use some form of eigenmode transmission, such that a wireless communication device antenna may receive signals intended for each client in one group. In accordance with the systems and methods disclosed herein, the total number of wireless communication devices may be limited only by the number or amount of antennas at the base station (e.g., access point). This may be beneficial by increasing throughput.

In one configuration of the systems and methods disclosed herein, an 802.11ac frame or packet may be used. A frame may include a preamble and data. In accordance with the systems and methods disclosed herein, a preamble may include one or more fields that are (typically or traditionally) transmitted in an omnidirectional fashion.

In a first alternative, the preamble may include a legacy short training field (L-STF), a legacy long training field (L-LTF), a legacy signal field (L-SIG), a first very high throughput signal or symbol A (VHT-SIG-A1), a second very high throughput signal or symbol A (VHT-SIG-A2), a very high throughput short training field (VHT-STF), one or more very high throughput long training fields (VHT-LTF(s)) and a very high throughput signal B (VHT-SIG-B). In this first alternative, the L-STF, L-LTF, L-SIG, VHT-SIG-A1 and VHT-SIG-A2 may be (typically) transmitted in an omnidirectional fashion.

In a second alternative, the preamble may include an L-STF, an L-LTF, an L-SIG, a VHT-SIG-A1, a VHT-SIG-A2, a third very high throughput field signal A (VHT-SIG-A3), a VHT-STF and one or more VHT-LTFs. In this second alternative, the L-STF, L-LTF, L-SIG, VHT-SIG-A1, VHT-SIG-A2 and VHT-SIG-A3 may typically be transmitted in an omnidirectional fashion.

Both of the alternative preambles start with a first or omnidirectional part that may be used for an 802.11a-based legacy deferral and for conveying 802.11ac information such as the length of a downlink MU-MIMO packet and bandwidth. The second preamble alternative may include all 802.11ac signaling information in the omnidirectional part, including a modulation and coding scheme (MCS) per downlink wireless communication device or client. The first preamble alternative may include some client-specific signaling like MCS in a steered VHT-SIG-B symbol.

Both preamble alternatives may have the possibility to use resolvable long training fields (LTFs) or unresolvable LTFs. For resolvable LTFs, for example, the number of LTF symbols per wireless communication device (e.g., client) is equal to or larger than the total number of spatial streams for all wireless communication devices (e.g., clients). For unresolvable LTFs, for example, the number of LTF symbols per wireless communication device (e.g., client) is only equal to or larger than the number of spatial streams per wireless communication device (e.g., client).

With resolvable LTFs, the number of wireless communication devices (e.g., clients) in a downlink MU-MIMO packet may be restricted to four in both preamble alternatives. With unresolvable LTFs, the number of wireless communication devices (e.g., clients) in a downlink MU-MIMO packet may be restricted to eight in the first preamble alternative and may be restricted to four in the second preamble alternative. For both preamble alternatives, the total number of streams for all downlink wireless communication devices (e.g., clients) may not exceed eight.

The systems and methods disclosed herein may allow MU-MIMO to multiple groups. In accordance with the systems and methods disclosed herein, for example, the number of downlink wireless communication devices (e.g., clients) may be split into groups of four or fewer in the case of resolvable LTFs or into groups of eight or fewer in the case of unresolvable LTFs. For instance, a base station (e.g., access point) may beamform to multiple groups simultaneously such that the omnidirectional part of the preambles are beamformed. In this way, each group may only "see" signaling relevant to that group. Furthermore, wireless communication devices (e.g., clients) within one group may receive reduced or minimal interference from transmissions to another group. Within one group, the base station (e.g., access point) may use resolvable LTFs and some form of eigenmode selection (e.g., minimum mean-square error (MMSE)-eigenmode selection (MMSE-ES) or multi-user eigenmode transmission (MET)) such that wireless communication devices (e.g., clients) within a group receive signals intended for all wireless communication devices (e.g., clients) in the same group.

For convenience and explanatory clarity, some abbreviations may be used as follows. $N_G$ is a number of groups. $N_{rxt}$ is a total number of wireless communication device (e.g., client) receivers. $N_{tx}$ is a number of base station (e.g., access point) transmitters. $N_{rxk}$ is a total number of receivers in group k. $N_{rxmk}$ is a number of receivers of wireless communication device (e.g., client) m in group k. $N_{ssmk}$ is a number of spatial streams of wireless communication device (e.g., client) m in group k. H represents a MU-MIMO downlink channel of size or dimensions $N_{rxt} \times N_{tx}$. $W_k$ is a beamforming or precoding matrix for group k of size or dimensions $N_{tx} \times N_{ssk}$. $SNR_k$ is an estimate of average signal-to-noise ratio (SNR) in downlink for group k. $N_{ck}$ is a number of wireless communication devices (e.g., clients) in group k. W(:, x:y) is a submatrix of W containing all rows and columns from x to y.

The systems and methods disclosed herein may use multi-group block diagonalization. In one configuration, the precoding matrix $W_k$ for group k for the first part of the preamble up to and including VHT-SIG-A (e.g., the omnidirectionally transmitted part) may be calculated as illustrated in Listing (1).

---

Listing (1)

For k = 1 to $N_G$ :
    determine $H_k$ : the channel to group k ($N_{rxk}$ rows and $N_{tx}$ columns of H);
    determine $H'_k$ : the channel to all groups except group k ( $N_{rxt} - N_{rxk}$ rows and $N_{tx}$ columns of H);
    [U', S', V'] = svd($H'_k$ );
    determine $V_n$ : the last $N_{tx} - (N_{rxt} - N_{rxk})$ columns of V' = null space of $H'_k$ ;
    for m = 1 to $N_{ck}$ :
        determine $H_{mk}$ : the channel to wireless communication device (e.g., client) m in group k ( $N_{rxmk}$ rows and $N_{tx}$ columns of H);

Listing (1)

$[U_m, S_m, V_m] = \text{svd}(H_{mk} V_n)$;
$W_k(:, m) = V_m(:,1) S_m^{-1}(1, 1)$ In Listing (1), svd( ) may be a singular value decomposition function.

In one configuration, the precoding matrix $W_k$ for group k for the second part of the packet or frame starting from the VHT-STF may be as illustrated in Listing (2). For example, the approach illustrated in Listing (2) below may use minimum mean-square error eigenmode selection within a group.

Listing (2)

For k = 1 to $N_G$ :
  determine $H_k$ : the channel to group k ( $N_{rxk}$ rows and $N_{tx}$ columns of H);
  determine $H'_k$ : the channel to all groups except group k ( $N_{rxt} - N_{rxk}$ rows and $N_{tx}$ columns of H);
  [U', S', V'] = svd($H'_k$);
  determine $V_n$ : the last $N_{tx} - (N_{rxt} - N_{rxk})$ columns of V' = null space of $H'_k$ ;
  for m = 1 to $N_{ck}$ :
    determine $H_{mk}$ : the channel to wireless communication device (e.g., client) m in group k ( $N_{rxmk}$ rows and $N_{tx}$ columns of H);
    $[U_m, S_m, V_m] = \text{svd}(H_{mk} V_n)$
    $Z(:,(m-1)N_{ssmk}+1:m*N_{ssmk}) = V_m(:,1:N_{ssmk})S_m(1:N_{ssmk},1:N_{ssmk})$
    $W_{km} = \left(ZZ^H + \left(\frac{1}{SNR_k}\right)I\right)^{-1} Z$ It should be noted that the only difference in the precoding for the first part of the preamble is that no attempt is made to cancel multi-user interference within a group. There is no need for this as all data is identical for all wireless communication devices (e.g., clients) in the same group for the first part of the preamble (e.g., up to the VHT-STF).

Alternatively, the first part of the preamble may be precoded identical to the second part. For example, interference may be canceled between spatial streams within a group even though a wireless communication device (e.g., client) cannot distinguish between spatial streams before receiving the following part (e.g., the VHT-LTFs, etc.). If a wireless communication device (e.g., client) has more than one spatial stream, the single stream of the first part of the preamble may be copied to all stream inputs of that wireless communication device (e.g., client). The first part of the preamble may still be decoded by all wireless communication devices (e.g., clients), as every spatial stream contains the same information. This approach may actually be preferable since it requires only a single precoding matrix per packet instead of two different precoding matrices.

Another configuration of the systems and methods disclosed herein may use multi-group block diagonalization with multi-user eigenmode transmission (MET). As noted above, the previous algorithm applied minimum mean-square error eigenmode selection within a group. One alternative is to use multi-user eigenmode transmission (MET) within a group. It should be noted that the minimum mean-square error eigenmode selection is simpler and may have better performance than this alternative approach. This alternative approach using multi-user eigenmode transmission (MET) is illustrated in Listing (3).

Listing (3)

For k = 1 to $N_G$ :
  determine $H_k$ : the channel to group k ( $N_{rxk}$ rows and $N_{tx}$ columns of H);
  determine $H'_k$ : the channel to all groups except group k ( $N_{rxt} - N_{rxk}$ rows and $N_{tx}$ columns of H);
  [U', S', V'] = svd($H'_k$);
  determine $V_n$ : the last $N_{tx} - (N_{rxt} - N_{rxk})$ columns of V' = null space of $H'_k$ ;
  for m = 1 to $N_{ck}$ :
    determine $H_{mk}$ : the channel to wireless communication device (e.g., client) m in group k ( $N_{rxmk}$ rows and $N_{tx}$ columns of H);
    $[U_m, S_m, V_m] = \text{svd}(H_{mk} V_n)$
    $D_m = V_m(:,1:N_{ssmk})S_m(1:N_{ssmk},1:N_{ssmk})$
    $Z = [D_1 \, D_{m-1} \, D_{m+1} \, D_{N_{ck}}]^H$ : matrix of steering vectors to all other clients in the group
    $[U_{mz}, S_{mz}, V_{mz}] = \text{svd}(Z)$
    $[U, S, V] = \text{svd}(D_m^H V_{mz}(:, N_{ssk} - N_{ssmk} + 1 : N_{ssk}))$
    $W_{km} = V_{mz}(:, N_{ssk} - N_{ssmk}) V \left(\left(\frac{I_{N_{ssmk}}}{SNR_k}\right) + S\right)^{-1}$ : steering matrix for wireless communication device (e.g., client) m in group k In one configuration, the systems and methods disclosed herein may use signaling as follows. Block diagonalization may be used on the first part of preamble (up to and including the VHT-SIG-A, for example). The same data contents may be used in the L-SIG for all groups such that any legacy 802.11a/n device may correctly defer for the duration of the downlink MU-MIMO packet or frame. Since the L-SIG is beamformed to two or more different groups, there is a possibility that wireless communication devices (e.g., stations) outside these groups do not receive the L-SIG with enough power to correctly decode the deferral length. Media access control (MAC) protection may be used to prevent collisions from these wireless communication devices (e.g., stations). For example, a separate clear to send (CTS) signal may be sent prior to the downlink MU-MIMO packet.

Channel state information (CSI) feedback may be used in one configuration of the systems and methods disclosed herein. CSI feedback may be limited to eight antennas in 802.11ac. A base station (e.g., access point or AP) with more than eight antennas may need to send multiple feedback requests to get the channel on all of its antennas.

For up to 15 base station (e.g., AP) transmit antennas, one example of a procedure using channel state information is described as follows. The base station may send a channel state information (CSI) request for every wireless communication device (e.g., client) twice, each time transmitting from no more than eight antennas (all other antennas transmit nothing, for example). Different channel state information (CSI) requests to the same wireless communication device (e.g., client) may need to contain at least one common transmit antenna. This may be needed to remove the phase shift occurring between two different channel state information feedbacks. In one configuration, multiple channel state information messages (e.g., CSI feedback) may be received (which is described below). Different channel state information feedback may be combined by normalizing all channels by the channel values for a common transmit antenna such that the values for the common antenna are matched.

For more than 15 antennas, the above procedure may be extended to three or more channel state information (CSI) requests, all with at least one common reference antenna.

The above procedure may also be used in groups of four antennas such that the existing 802.11n channel state information feedback can be used, which is limited to a maximum of four transmitters.

One configuration of flexible multi-group block diagonalization may be used in accordance with the systems and methods disclosed herein. In this configuration, assume that for a wireless communication device (e.g., client) c in group k, the base station (e.g., AP) only gets the beamforming matrix and average signal-to-noise ratio (SNR) per stream, where wireless communication device (e.g., client) c obtained the beamforming matrix $V_c''(:, 1: N_{ssck})$ through $[U_c'', S_c'', V_c''] = svd(H_{ck})$, for example, while the other wireless communication device(s) (e.g., clients) fed back the channel state information $H_{mk}$. $H_{mk}$ is the client channel, $U_c''$ includes the left singular vectors of $H_{ck}$, $S_c''$ are the singular values of $H_{ck}$ and $V_c''$ includes the right singular vectors of $H_{ck}$, $V_c''$ is a beamforming matrix for the wireless communication device c and $N_{ssck}$ is a number of spatial streams for the wireless communication device c in group k. In this case, the base station (e.g., AP) sets $H_{ck}$ to $V_c''(:, 1: N_{ssck})^H$ (as we as the corresponding part in $H_k$). It should be noted that matrices herein may denote a wireless communication device with a subscript c. The rest of the processing may be performed the same as the previously described multi-group block diagonalization procedures illustrated in Listing (1), Listing (2) and/or Listing (3) above. For example, suppose that the procedure illustrated in Listing (1) above is used, then wireless communication device (e.g., client) c may apply dedicated spatial filtering at its receive side to recover its data as illustrated in Equation (1).

$$U_c^H S_c''^{-1}(1:N_{ssck}, 1:N_{ssck}) * U_c''^H \quad (1)$$

In Equation (1), $U_c$ is given in Listing (1) for wireless communication device (e.g., client) m=c. Alternatively, depending on the MU-MIMO technique used, the receiver may do any other type of MIMO processing or interference suppression (assuming that proper channel estimation is done, for example).

Another configuration of flexible multi-group block diagonalization may be used in accordance with the systems and methods disclosed herein. In this configuration, assume that for wireless communication device (e.g., client) c in group k, the base station (e.g., AP) only gets the beamforming matrix and singular values, where wireless communication device (e.g., client) c obtained the beamforming matrix $V_c''(:, 1: N_{ssck})$ and singular values $S_c''(1: N_{ssck}, 1: N_{ssck})$ through $[U_c'', S_c'', V_c''] = svd(H_{ck})$, for example, while the other wireless communication devices (e.g., clients) fed back the channel state information $H_{mk}$. In this case, the base station (e.g., AP) sets $H_{ck}$ to $S_c''(1: N_{ssck}, 1: N_{ssck})V_c''(:, 1: N_{ssck})^H$ (as well corresponding part in $H_k$). The rest of the processing may be performed the same as the previously described multi-group block diagonalization procedures illustrated in Listing (1), Listing (2) and/or Listing (3) above. For example, suppose that the procedure illustrated in Listing (1) above is used, then wireless communication device (e.g., client) c may apply dedicated spatial filtering at its receive side to recover its data as illustrated in Equation (2).

$$U_c^H * U_c''^H \quad (2)$$

In Equation (2), $U_c$ is given in Listing (1) for wireless communication device (e.g., client) m=c. Alternatively, depending on the MU-MIMO technique used, the receiver may do any other type of MIMO processing or interference suppression (assuming that proper channel estimation is done, for example).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a transmitting communication device 102 and one or more receiving communication devices 142 in which systems and methods for multiple group communications may be implemented. Examples of the transmitting communication device 102 include base stations, access points, etc. Examples of the receiving communication device(s) 142 include wireless communication devices, access terminals, stations, etc. The transmitting communication device 102 may include an encoder 106 with an input for receiving payload data 104 and/or overhead data 116 to be transmitted to one or more receiving communication devices 142. The payload data 104 may include voice, video, audio and/or other data. The overhead data 116 may include control information, such as information that specifies a data rate, modulation and coding scheme (MCS), channel bandwidth, frame length, defer periods, media access control (MAC) information (e.g., clear to send (CTS) information), channel information requests (e.g., channel state information (CSI) requests), etc. The encoder 106 might encode data 104, 116 for forward error correction (FEC), encryption, packeting and/or other encodings known for use with wireless transmission.

A constellation mapper 110 maps the data provided by the encoder 106 into constellations. For instance, the constellation mapper 110 may use modulation schemes such as binary phase-shift keying (BPSK), quadrature amplitude modulation (QAM), etc. Where quadrature-amplitude modulation (QAM) is used, for example, the constellation mapper 110 might provide two bits per spatial stream 138, per data subcarrier 140, per symbol period. Furthermore, the constellation mapper 110 may output a 16-QAM constellation signal for each spatial stream 138, for each data subcarrier 140, for each symbol period. Other modulations may be used, such as 64-QAM, which would result in a consumption of six bits per spatial stream 138, per data subcarrier 140, per symbol period. Other variations are also possible.

The output of the constellation mapper 110 is provided to a space-time-frequency mapper 108 that maps the data onto spatial-time-frequency (STF) dimensions of the transmitter. The dimensions represent various constructs or resources that allow for data to be allocated. A given bit or set of bits (e.g., a grouping of bits, a set of bits that correspond to a constellation point, etc.) may be mapped to a particular place among the dimensions. In general, bits and/or signals mapped to different places among the dimensions are transmitted from the transmitting communication device 102 such that they are expected to be, with some probability, differentiable at one or more receiving communication devices 142. In one configuration, the space-time-frequency mapper 108 may perform space-time block coding (STBC).

One or more spatial streams 138 may be transmitted from the transmitting communication device 102 such that the transmissions on different spatial streams 138 may be differentiable at a receiver (with some probability). For example, bits mapped to one spatial dimension are transmitted as one spatial stream 138. That spatial stream 138 might be transmitted on its own antenna 132 spatially separate from other antennas 132, its own orthogonal superposition over a plurality of spatially separated antennas 132, its own polarization, etc. Many techniques for spatial stream 138 separation (involving separating antennas 132 in space or other techniques that would allow their signals to be distinguished at a receiver, for example) are known and can be used.

In the example shown in FIG. 1, there are one or more spatial streams 138 that are transmitted using the same or a different number of antennas 132a-n (e.g., one or more). In some instances, only one spatial stream 138 might be available because of inactivation of one or more other spatial streams 138.

In the case that the transmitting communication device 102 uses a plurality of frequency subcarriers 140, there are multiple values for the frequency dimension, such that the space-time-frequency mapper 108 might map some bits to one frequency subcarrier 140 and other bits to another frequency subcarrier 140. Other frequency subcarriers 140 may be reserved as guard bands, pilot tone subcarriers, or the like that do not (or do not always) carry data 104, 116. For example, there may be one or more data subcarriers 140 and one or more pilot subcarriers 140. It should be noted that, in some instances or configurations, not all subcarriers 140 may be excited at once. For instance, some tones may not be excited to enable filtering. In one configuration, the transmitting communication device 102 may utilize orthogonal frequency-division multiplexing (OFDM) for the transmission of multiple subcarriers 140. For instance, the space-time-frequency mapper 108 may map (encoded) data 104, 116 to space, time and/or frequency resources according to the multiplexing scheme used.

The time dimension refers to symbol periods. Different bits may be allocated to different symbol periods. Where there are multiple spatial streams 138, multiple subcarriers 140 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of spatial streams 138 times the number of data subcarriers 140, divided by the length of the symbol period.

Thus, the space-time-frequency mapper 108 may map bits (or other units of input data) to one or more spatial streams 138, data subcarriers 140 and/or symbol periods. Separate spatial streams 138 may be generated and/or transmitted using separate paths. In some implementations, these paths are implemented with distinct hardware, whereas in other implementations, the path hardware is reused for more than one spatial stream 138 or the path logic is implemented in software that executes for one or more spatial streams 138. More specifically, each of the elements illustrated in the transmitting communication device 102 may be implemented as a single block/module or as multiple blocks/modules. For instance, the transmitter radio frequency block(s) 126 element may be implemented as a single block/module or as multiple parallel blocks/modules corresponding to each antenna 132a-n (e.g., each spatial stream 138). As used herein, the term "block/module" and variations thereof may indicate that a particular element or component may be implemented in hardware, software or a combination of both.

The transmitting communication device 102 may include a pilot generator block/module 130. The pilot generator block/module 130 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The transmitting communication device 102 may include a pseudo-random noise generator 128 in some configurations. The pseudo-random noise generator 128 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. When the pilot sequence is sent to a receiving communication device 142, the received pilot sequence may be unscrambled by a pilot processor 148.

The output(s) of the space-time-frequency mapper 108 may be spread over frequency and/or spatial dimensions. A pilot insertion block/module 112 inserts pilot tones into the pilot tone subcarriers 140. For example, the pilot sequence may be mapped to subcarriers 140 at particular indices. For instance, pilot symbols from the pilot sequence may be mapped to subcarriers 140 that are interspersed with data subcarriers 140 and/or other subcarriers 140. In other words, the pilot sequence or signal may be combined with the data sequence or signal. In some configurations, one or more direct current (DC) tones may be centered at index 0.

The data and/or pilot signals are provided to an inverse discrete Fourier transform (IDFT) block/module 120. The inverse discrete Fourier transform (IDFT) block/module 120 converts the frequency signals of the data 104, 116 and inserted pilot tones into time domain signals representing the signal over the spatial streams 138 and/or time-domain samples for a symbol period. In one configuration, for example, the IDFT block/module 120 may perform a 256-point inverse fast Fourier transform (IFFT).

The time-domain signal is provided to a formatter 122. The formatter (e.g., one or more formatting blocks/modules) 122 may take the output of the inverse discrete Fourier transform (IDFT) block/module 120, convert it from parallel signals to serial (P/S), add a cyclical prefix and/or perform guard interval windowing, etc.

The formatter 122 output may be provided to a digital-to-analog converter (DAC) 124. The digital-to-analog converter (DAC) 124 may convert the formatter 122 output from one or more digital signals to one or more analog signals. The digital-to-analog converter (DAC) 124 may provide the analog signal(s) to one or more transmitter radio frequency (TX RF) blocks 126.

The one or more transmitter radio frequency blocks 126 may be coupled to or include a power amplifier. The power amplifier may amplify the analog signal(s) for transmission. The one or more transmitter radio frequency blocks 126 may output radio frequency (RF) signals to one or more antennas 132a-n, thereby transmitting the data 104, 116 that was input to the encoder 106 over a wireless medium suitably configured for receipt by one or more receiving communication devices 142.

The transmitting communication device 102 may also include one or more receiver radio frequency blocks/modules 134. The one or more receiver radio frequency blocks/modules 134 may be used to receive signals from the one or more receiving communication devices 142. For example, the transmitting communication device 102 may transmit pilot and/or training symbols to one or more receiving communication devices 142. The one or more receiving communication devices 142 may use the pilot and/or training symbols to estimate a channel. The one or more receiving communication devices 142 may then transmit a feedback message (e.g., channel state information (CSI) feedback) to the transmitting communication device 102, which may receive the feedback message using the receiver radio frequency block(s)/module(s) 134. In another example, the transmitting communication device 102 may not receive explicit feedback messages from the one or more receiving communication devices 142, but may use other signals or messages received from the one or more receiving communication devices 142 by the one or more receiver radio frequency block(s)/module(s) 134 to estimate a channel.

The transmitting communication device 102 may include a multi-group communication block/module 114. The multi-group communication block/module 114 may be used to communicate with multiple groups of receiving communication devices 142. For example, the multi-group communication block/module 114 may use a channel estimate based on signals provided by the one or more receiver radio frequency blocks/modules 134. For instance, a channel estimate (e.g., an explicit feedback message) may be provided to the multi-group communication block/module 114 and/or the multi-group communication block/module 114 may determine a channel estimate using signals received by the receiver radio frequency blocks/modules 134.

The multi-group communication block/module 114 may determine a number of receiving communication devices 142. For example, the multi-group communication block/module 114 may determine a number of receiving communication devices 142 based on signals received from the receiving communication devices 142, such as requests to access communication resources provided by the transmitting communication device 102.

The multi-group communication block/module 114 may split the receiving communication devices 142 into groups. For example, the multi-group communication block/module 114 may use received signals to determine a grouping of receiving communication devices 142.

In some configurations, the transmitting communication device 102 (e.g., multi-group communication block/module 114) may use one approach or a combination of approaches described hereafter to determine a grouping. One approach may be referred to as received signal strength ordering. Received signal strength ordering is one of the simplest approaches where groups are formed based on similar signal strength. In practical multi-user channels, signal strength may be closely related to the actual capacity of a downlink user. It may be advantageous to have all clients in a downlink multi-user (MU) transmission at roughly the same data rate. Another approach may be referred to as single user data rate ordering. In practice, the transmitting communication device 102 may already have an estimate of the maximum achievable single user data rate. It 102 can use the ordered rates to form groups, thereby making one group with the four highest rates and another group with the four lowest rates, for instance. Yet another approach may be referred to as capacity calculation. Based on explicit channel feedback (e.g., compressed beamforming feedback in 802.11n or 802.11ac), the transmitting communication device 102 may calculate which two groups provide a maximum capacity. This may be more difficult than the first two approaches described, however.

In some configurations, the grouping may be additionally or alternatively based on the spatial location of the receiving communication devices 142. For instance, the multi-group communication block/module 114 may split eight receiving communication devices 142 into two groups of four, where a first group of four is located in one spatial region while a second group of four is location in another spatial region.

The multi-group communication block/module 114 may include a precoding block/module 118. The precoding block/module 118 may be used to generate a precoding matrix used to beamform signals transmitted from the one or more transmitter radio frequency blocks/modules 126. For example, a precoding matrix may include weighting factors that weight transmissions from each of the antennas 132a-n. This may allow the transmitting communication device 102 to steer transmitted signals in a particular spatial direction. The precoding matrix provided by the multi-group communication block/module 114 may beamform signals such that a signal or set of signals may be sent to a particular group of receiving communication devices 142. For example, a first signal or set of signals may be sent to a first group of receiving communication devices 142 (using a first beam) while a second signal or set of signals may be sent to a second group of receiving communication devices 142 (using a second beam).

One or more receiving communication devices 142 may receive and use signals from the transmitting communication device 102. For example, a receiving communication device 142 may use a pilot sequence generated by the transmitting communication device 102 to characterize the channel, transmitter impairments and/or receiver impairments and use that characterization to improve receipt of data 104, 116 encoded in the transmissions.

For example, a receiving communication device 142 may include one or more antennas 136a-n (which may be greater than, less than or equal to the number of transmitting communication device 102 antennas 132a-n and/or the number of spatial streams 138) that feed to one or more receiver radio frequency (RX RF) blocks 158. The one or more receiver radio frequency (RX RF) blocks 158 may output analog signals to one or more analog-to-digital converters (ADCs) 156. For example, a receiver radio frequency block 158 may receive and downconvert a signal, which may be provided to an analog-to-digital converter 156. As with the transmitting communication device 102, the number of spatial streams 138 processed may or may not be equal to the number of antennas 136a-n. Furthermore, each spatial stream 138 need not be limited to one antenna 136, as various beamsteering, orthogonalization, etc., techniques may be used to arrive at a plurality of receiver streams.

The one or more analog-to-digital converters (ADCs) 156 may convert the received analog signal(s) to one or more digital signal(s). These output(s) of the one or more analog-to-digital converters (ADCs) 156 may be provided to one or more time and/or frequency synchronization blocks/modules 154. A time and/or frequency synchronization block/module 154 may (attempt to) synchronize or align the digital signal in time and/or frequency (to a receiving communication device 142 clock, for example).

The (synchronized) output of the time and/or frequency synchronization block(s)/module(s) 154 may be provided to one or more deformatters 152. For example, a deformatter 152 may receive an output of the time and/or frequency synchronization block(s)/module(s) 154, remove prefixes, etc., and/or parallelize the data for discrete Fourier transform (DFT) processing.

One or more deformatter 152 outputs may be provided to one or more discrete Fourier transform (DFT) blocks/modules 150. The discrete Fourier transform (DFT) blocks/modules 150 may convert one or more signals from the time domain to the frequency domain. A pilot processor 148 may use the frequency domain signals (per spatial stream 138, for example) to determine one or more pilot tones (over the spatial streams 138, frequency subcarriers 140 and/or groups of symbol periods, for example) sent by the transmitting communication device 102. The pilot processor 148 may additionally or alternatively de-scramble the pilot sequence. The pilot processor 148 may use one or more pilot sequences for phase and/or frequency and/or amplitude tracking. The pilot tone(s) may be provided to a space-time-frequency detection and/or decoding block/module 146, which may detect and/or decode the data over the various dimensions. The space-time-frequency detection and/or decoding block/module 146 may output received data 144 (e.g., the receiving communication device's 142 estimation of the payload data 104 and/or overhead data 116 transmitted by the transmitting communication device 102).

In accordance with the systems and methods disclosed herein, the space-time-frequency detection/decoding block/module 146 may use spatial filtering, MIMO processing and/or other interference rejection techniques to obtain the data 144. For example, when the transmitting communication device 102 splits the receiving communication devices 142 into groups and transmits a signal or set of signals to each group, a receiving communication device 142 may receive signals for all of the receiving communication devices 142 in its group. The spatial filtering, MIMO processing and/or other interference rejection techniques may be used to recover or separate data 144 intended for a receiving communication device 142 from data intended for one or more other receiving communication devices 142 in its group.

In some configurations, the receiving communication device 142 knows the transmit sequences sent as part of a total information sequence. The receiving communication device 142 may perform channel estimation with the aid of these known transmit sequences. To assist with pilot tone tracking, processing and/or data detection and decoding, a channel estimation block/module 160 may provide estimation signals to the pilot processor 148 and/or the space-time-frequency detection and/or decoding block/module 146 based on the output from the time and/or frequency synchronization block/module 154. Alternatively, if the deformatting and discrete Fourier transform is the same for the known transmit sequences as for the payload data portion of the total information sequence, the estimation signals may be provided to the pilot processor 148 and/or the space-time-frequency detection and/or decoding block/module 146 based on the output from the discrete Fourier transform (DFT) blocks/modules 150.

Additionally or alternatively, the channel estimation block/module 160 may provide a channel estimate to one or more transmitter radio frequency blocks/modules 162 for transmission to the transmitting communication device 102. For example, the channel estimation block/module 160 may use pilot and/or training symbols sent from the transmitting communication device 102 to generate a channel feedback message. This channel feedback message may be provided to the one or more transmitter radio frequency blocks/modules 162. The one or more transmitter radio frequency blocks/modules 162 may transmit the feedback message to the transmitting communication device 102 using one or more antennas 136a-n.

Figure 2:
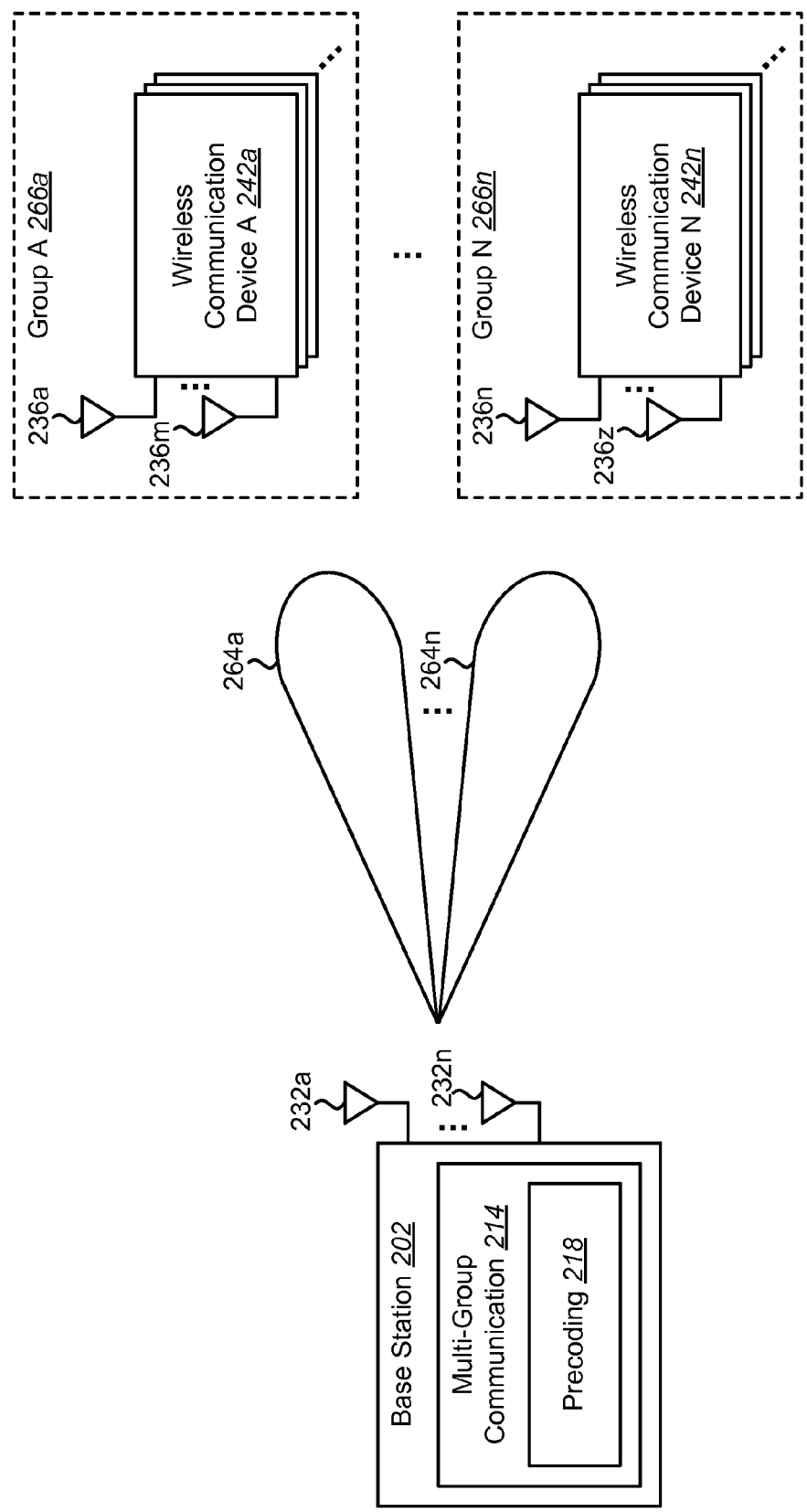
FIG. 2 is a block diagram illustrating one example of beamforming to multiple groups of wireless communication devices in accordance with the systems and methods disclosed herein.

FIG. 2 is a block diagram illustrating one example of beamforming to multiple groups 266 of wireless communication devices 242 in accordance with the systems and methods disclosed herein. In this example, a base station 202 transmits beamformed signals or beams 264a-n to multiple groups 266a-n of wireless communication devices 242a-n. The base station 202 illustrated in FIG. 2 is one example of a transmitting communication device 102. The base station 202 may use antennas 232a-n to transmit electromagnetic signals to wireless communication devices 242. Wireless communication devices 242 are one example of receiving communication devices 142. Each wireless communication device 242 may include one or more antennas 236 for the reception and/or transmission of electromagnetic signals. For example, wireless communication device A 242a may include one or more antennas 236a-m and wireless communication device N 242n may include one or more antennas 236n-z.

The base station 202 includes a multi-group communication block/module 214. The multi-group communication block/module 214 may be used to communicate with multiple groups 266a-n of wireless communication devices 242a-n. For example, the multi-group communication block/module 214 may use a channel estimate based on signals provided by the wireless communication devices 242. For instance, a channel estimate (e.g., an explicit feedback message) may be provided to the multi-group communication block/module 214 and/or the multi-group communication block/module 214 may determine a channel estimate using signals received from the wireless communication devices 242.

The multi-group communication block/module 214 may determine a number of wireless communication devices 242. For example, the multi-group communication block/module 214 may determine a number of wireless communication devices 242 based on signals received from the wireless communication devices 242, such as requests to access communication resources provided by the base station 202.

The multi-group communication block/module 214 may split the wireless communication devices 242 into groups 266a-n. For example, the multi-group communication block/module 214 may use received signals to determine a grouping of wireless communication devices 242. In some configurations, the grouping may be determined using one or more of the approaches described above in connection with FIG. 1.

The multi-group communication block/module 214 may include a precoding block/module 218. The precoding block/module 218 may be used to generate a precoding matrix used to beamform signals into beams 264a-n transmitted from the base station 202. For example, a precoding matrix may include weighting factors that weight transmissions from each of the antennas 232a-n. This may allow the base station 202 to steer transmitted signals in a particular spatial direction. The precoding matrix provided by the multi-group communication block/module 214 may beamform signals such that a signal or set of signals may be sent in a beam 264 to a particular group of wireless communication devices 242. For example, a first signal or set of signals may be sent to a first group 266a of wireless communication devices 242a (using a first beam 264a)

while a second signal or set of signals may be sent to a second group 266n of wireless communication devices 242n (using a second beam 264n).

In accordance with the systems and methods disclosed herein, each wireless communication device 242a-n may use spatial filtering, MIMO processing and/or other interference rejection techniques to obtain data transmitted from the base station 202. For example, when the base station 202 splits the wireless communication devices 242 into groups 266a-n and transmits a signal or set of signals to each group 266a-n, a wireless communication device 242 may receive signals for all of the wireless communication devices 242 in its group 266. For example, all of the wireless communication devices 242 in group A 266a may receive a signal or set of signals sent using a first beam 264a. The signal or set of signals sent in the first beam 264a may include information for one, multiple or all wireless communication devices 242 in group A 266a. The spatial filtering, MIMO processing and/or other interference rejection techniques may be used to recover or separate data intended for a wireless communication device 242 from data intended for one or more other wireless communication devices 242 in its group 266.

Thus, the systems and methods disclosed herein may allow MU-MIMO to multiple groups 266a-n. In accordance with the systems and methods disclosed herein, for example, the number of downlink wireless communication devices (e.g., clients) 242 may be split into groups 266 of four or fewer in the case of resolvable LTFs or into groups 266 of eight or fewer in the case of unresolvable LTFs. For instance, the base station (e.g., access point) 202 may beamform to multiple groups 266a-n simultaneously such that an omnidirectional part of preambles are beamformed. In this way, each group 266a-n may only "see" signaling relevant to that group 266a-n (e.g., group A 266a may only receive a first beam 264a and group N 266n may only receive a last beam 264n). Furthermore, wireless communication devices (e.g., clients) 242 within one group 266 may receive reduced or minimal interference from transmissions to another group 266. Within one group 266, the base station (e.g., access point) 202 may use resolvable LTFs and some form of eigenmode selection (e.g., minimum mean-square error (MMSE)-eigenmode selection (MMSE-ES) or multi-user eigenmode transmission (MET)) such that wireless communication devices (e.g., clients) 242 within a group 266 receive signals intended for all wireless communication devices (e.g., clients) 242 in the same group 266.

Figure 3:
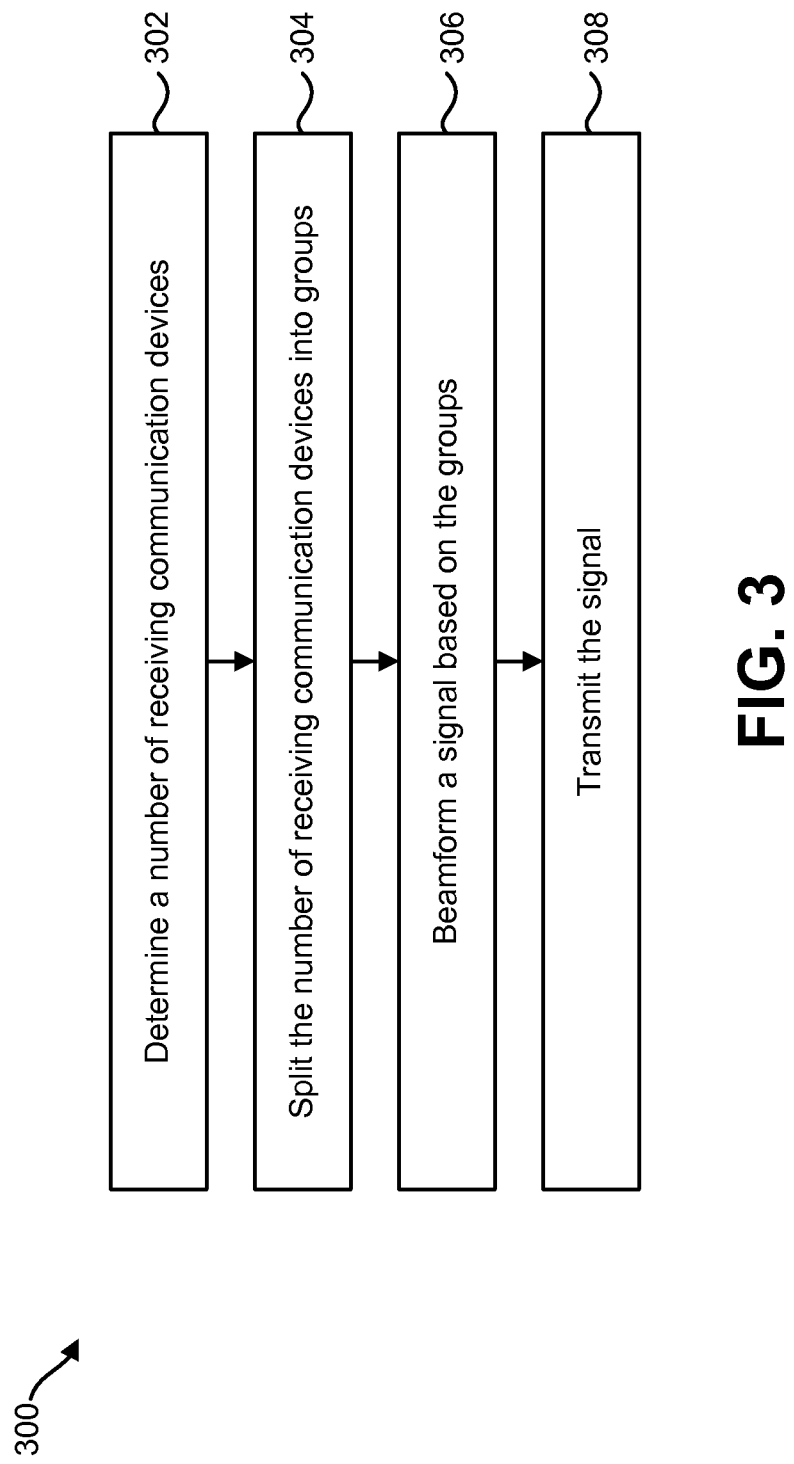
FIG. 3 is a flow diagram illustrating one configuration of a method for multiple group communications.

FIG. 3 is a flow diagram illustrating one configuration of a method 300 for multiple group communications. A transmitting communication device 102 may determine 302 a number of receiving communication devices 142. For example, the transmitting communication device 102 may determine a number of receiving communication devices 142 based on signals received from the receiving communication devices 142, such as requests to access communication resources provided by the transmitting communication device 102. For instance, one or more receiving communication devices 142 within communication range of the transmitting communication device 102 may send a message to the transmitting communication device 102 attempting to establish a link with or use resources provided by the transmitting communication device 102. The transmitting communication device 102 may keep a tally of identified receiving communication devices 142 in range that are attempting to communicate with the transmitting communication device 102. This tally may be the number of receiving communication devices 142.

The transmitting communication device 102 may split 304 the number of receiving communication devices 142 into groups. For example, the transmitting communication device 102 may use received signals to determine a grouping of receiving communication devices 142. For instance, one or more of the approaches for determining groups described above in connection with FIG. 1 may be used.

In some configurations, additional or alternative considerations may be taken into account. For example, the grouping may be based on the spatial location of the receiving communication devices 142. For example, a transmitting communication device 102 may use a phase shift or timing difference between signals received at separate antennas 132a-n from a receiving communication device 142 to determine a spatial location (e.g., direction) of the receiving communication device 142 or a direction of signals received from the receiving communication device 142 relative to the transmitting communication device 102.

Other additional or alternative considerations may be taken into account. For example, the receiving communication devices 142 may be grouped into groups with as large a number as possible. For instance, the transmitting communication device 102 may split seven receiving communication devices 142 into a group of four and a group of three, where a group of four is the largest group allowed. Other considerations may include a distance. For example, a distance (between angles) may be used to determine a grouping. For instance, assume that two receiving communication devices 142 are close to each other, but are distant from three other receiving communication devices 142 that are close to each other. In this case, the transmitting communication device 102 may form groups of receiving communication devices 142 that are close to each other. Thus, five receiving communication devices 142 may be grouped into a group of two and into a group of three, since the two are distant from the three. Yet additional or alternative considerations may be taken into account, such as receiving communication device 142 capability, user preference, resource usage, etc.

The transmitting communication device 102 may beamform 306 a signal based on the groups. For example, the transmitting communication device 102 may generate a beam for each group of receiving communication devices 142, where each beam carries a signal or set of signals corresponding to each group. For example, the transmitting communication device 102 may generate a precoding matrix for each group of receiving communication devices 142. For example, a precoding matrix may include weighting factors that weight transmissions for each antenna 132a-n of the transmitting communication device 102. This may allow the transmitting communication device 102 to steer transmitted signals in a particular spatial direction. A group precoding matrix may beamform signals such that a signal or set of signals may be sent to a particular group of receiving communication devices 142. For example, a first signal or set of signals may be sent to a first group of receiving communication devices 142 (using a first beam) while a second signal or set of signals may be sent to a second group of receiving communication devices 142 (using a second beam).

The transmitting communication device 102 may transmit 308 the signal. For example, the transmitting communication device 102 may transmit 308 a signal or set of signals to each group of receiving communication devices 142 using each of the group precoding matrices or steering matrices.

Figure 4:
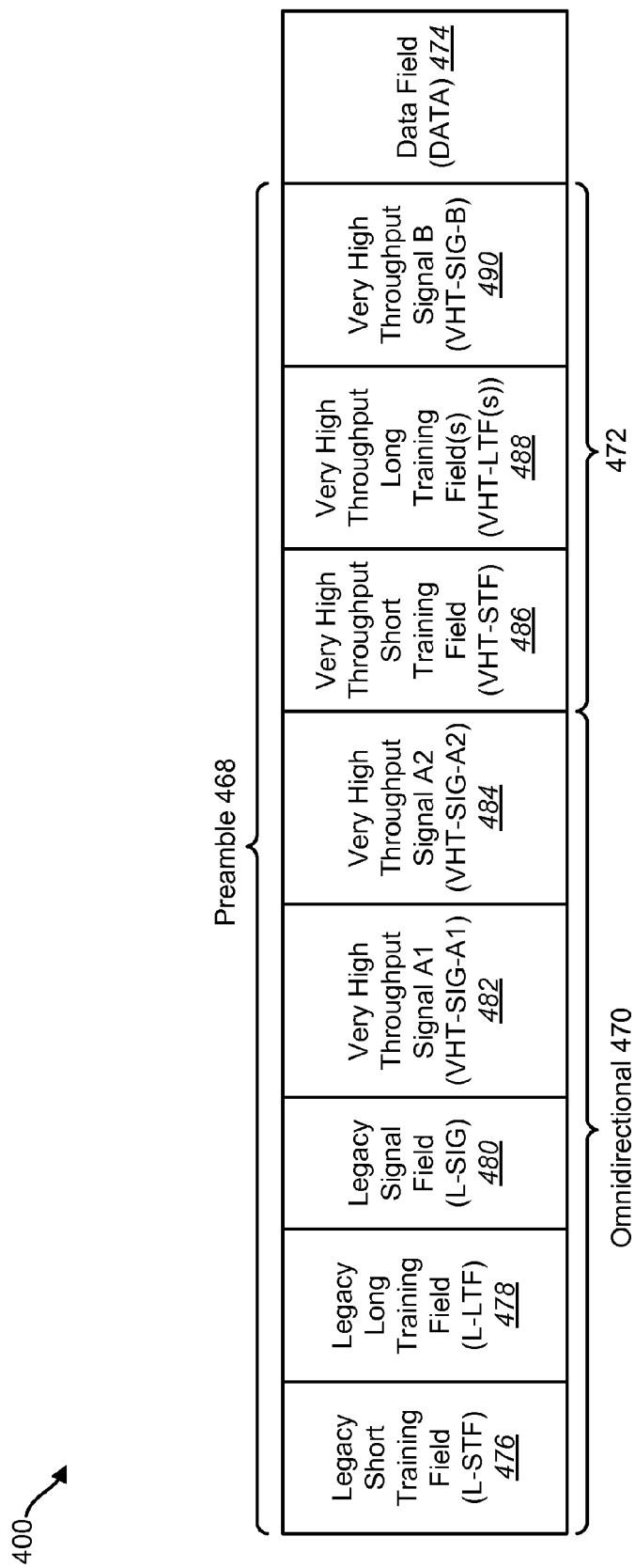
FIG. 4 is a diagram illustrating one example of a communication frame that may be used in accordance with the systems and methods disclosed herein.

FIG. 4 is a diagram illustrating one example of a communication frame 400 that may be used in accordance with the systems and methods disclosed herein. The frame 400 may include one or more sections or fields for preamble symbols, pilot symbols and/or data symbols. For example, the frame 400 may comprise an IEEE 802.11ac preamble 468 and a data field 474 (e.g., DATA or VHT-DATA field). In one configuration, the preamble 468 may have a duration of 40 to 68 microseconds (μs). The preamble 468 and/or pilot symbols may be used (by a receiving communication device 142, for example) to synchronize, detect, demodulate and/or decode preamble data (e.g., overhead data 116) and/or payload data 104 included in the frame 400.

The frame 400 with a preamble 468 may be structured including several fields. In one configuration, an 802.11ac frame 400 may include a legacy short training field or non-high throughput short training field (L-STF) 476, a legacy long training field or non-high throughput long training field (L-LTF) 478, a legacy signal field or non-high throughput signal field (L-SIG) 480, a very high throughput signal symbol or field A1 (VHT-SIG-A1) 482, a very high throughput signal symbol or field A2 (VHT-SIG-A2) 484, a very high throughput short training field (VHT-STF) 486, one or more very high throughput long training fields (VHT-LTFs) 488, a very high throughput signal field B (VHT-SIG-B) 490 and a data field (DATA) 474.

The preamble 468 may accommodate transmit beamforming and MU-MIMO. The first part or portion 470 of the preamble 468 may be typically transmitted in an omnidirectional fashion (using cyclic diversity or another scheme, for example). However, according to the systems and methods disclosed herein, this first or omnidirectional part 470 may be beamformed. This first part 470 of the preamble 468 may include the L-STF 476, L-LTF 478, L-SIG 480, VHT-SIG-A1 482, and VHT-SIG-A2 484. This first part 470 of the preamble 468 may be decodable by legacy devices (e.g., devices that comply with legacy or earlier specifications).

A second part or portion 472 of the preamble 468 may be transmitted in an omnidirectional fashion, may be beamformed or may be MU-MIMO precoded. This second part 472 of the preamble 468 includes the VHT-STF 486, one or more VHT-LTFs 488, and the VHT-SIG-B 490. The data symbols (in the data field 474, for example) may be transmitted with the same or different antenna pattern as the second part 472 of the preamble 468. The data field 474 may also be transmitted omnidirectionally, may be beamformed or may be MU-MIMO precoded. The data symbols and the second part 472 of the preamble 468 may not be decodable by legacy devices (or even by all 802.11ac devices, for example).

The preamble 468 may include some control data that is decodable by legacy 802.11a and 802.11n receivers. This control data is contained in the L-SIG 480. The data in the L-SIG 480 informs all receivers how long the transmission will occupy the wireless medium, so that all devices may defer their transmissions for an accurate amount of time. Additionally, the preamble 468 allows 802.11ac devices to distinguish the transmission as an 802.11ac transmission (and avoid determining that the transmission is in an 802.11a or 802.11n format). Furthermore, the preamble 468 may cause legacy 802.11a and 802.11n devices to detect the transmission as an 802.11a transmission, which is a valid transmission with valid data in the L-SIG 480.

In one example, the preamble 468 starts with a first or omnidirectional part 470 that may be used for an 802.11a-based legacy deferral and for conveying 802.11ac information such as the length of a downlink MU-MIMO packet and bandwidth. The preamble 468 may include some signaling specific to a receiving communication device 142 (e.g., client-specific signaling), such as a modulation and coding scheme (MCS) in a steered VHT-SIG-B 490 symbol.

The preamble 468 may have the possibility to use resolvable Long Training Fields (LTFs) or unresolvable LTFs. For resolvable LTFs, for example, the number of LTF symbols per receiving communication device (e.g., client) 142 is equal to or larger than the total number of spatial streams 138 for all receiving communication devices (e.g., clients) 142. For unresolvable LTFs, for example, the number of LTF symbols per receiving communication device (e.g., client) 142 is equal to or larger than the number of spatial streams 138 per receiving communication device (e.g., client) 142.

With resolvable LTFs, the number of receiving communication devices (e.g., clients) 142 in a downlink MU-MIMO packet may be restricted to four in the preamble 468 illustrated. With unresolvable LTFs, the number of receiving communication devices (e.g., clients) 142 in a downlink MU-MIMO packet may be restricted to eight in the preamble 468. For this preamble 468, the total number of streams for all downlink receiving communication devices (e.g., clients) 142 may not exceed eight.

Figure 5:
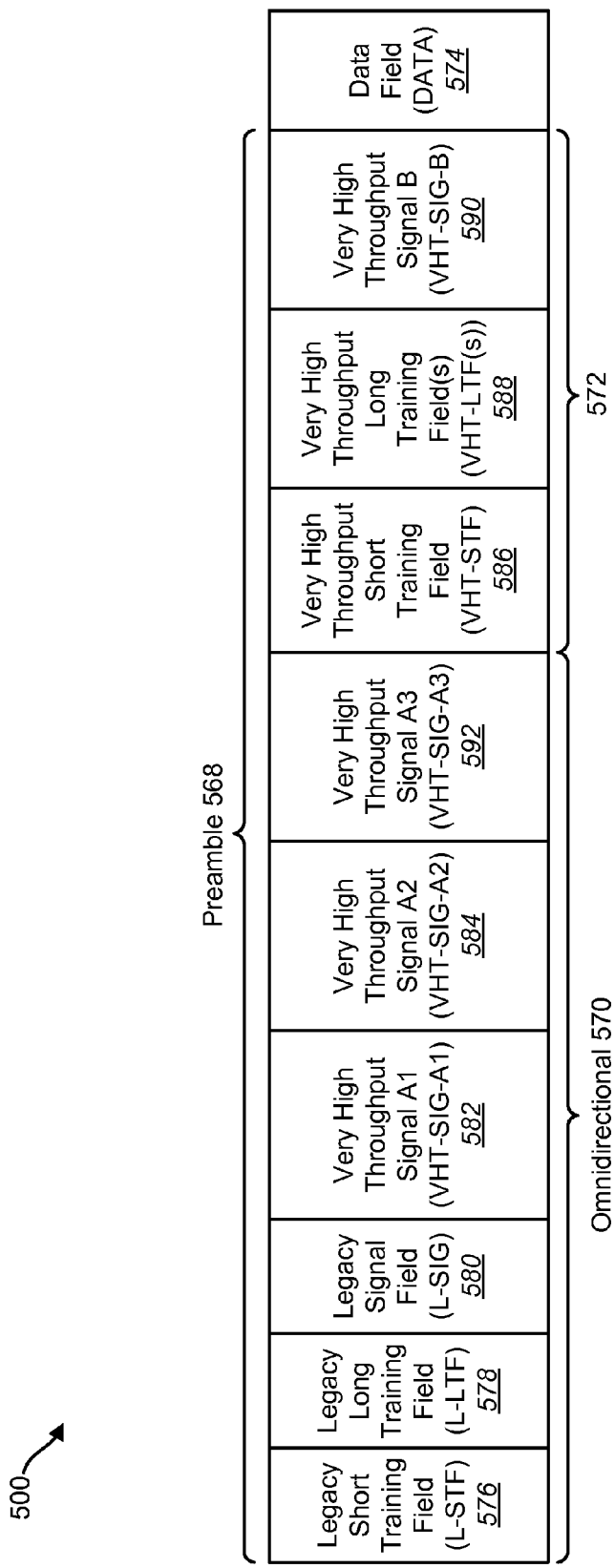
FIG. 5 is a diagram illustrating another example of a communication frame that may be used in accordance with the systems and methods disclosed herein.

FIG. 5 is a diagram illustrating another example of a communication frame 500 that may be used in accordance with the systems and methods disclosed herein. The frame 500 may include one or more sections or fields for preamble symbols, pilot symbols and/or data symbols. For example, the frame 500 may comprise an IEEE 802.11ac preamble 568 and a data field 574 (e.g., DATA or VHT-DATA field). In one configuration, the preamble 568 may have a duration of 50 to 68 microseconds (μs). The preamble 568 and/or pilot symbols may be used (by a receiving communication device 142, for example) to synchronize, detect, demodulate and/or decode preamble data (e.g., overhead data 116) and/or payload data 104 included in the frame 500.

The frame 500 with a preamble 568 may be structured including several fields. In one configuration, an 802.11ac frame 500 may include a legacy short training field or non-high throughput short training field (L-STF) 576, a legacy long training field or non-high throughput long training field (L-LTF) 578, a legacy signal field or non-high throughput signal field (L-SIG) 580, a very high throughput signal symbol or field A1 (VHT-SIG-A1) 582, a very high throughput signal symbol or field A2 (VHT-SIG-A2) 584, a very high throughput signal symbol or field A3 (VHT-SIG-A3) 592, a very high throughput short training field (VHT-STF) 586, one or more very high throughput long training fields (VHT-LTFs) 588, a very high throughput signal field B (VHT-SIG-B) 590 and a data field (DATA) 574.

The preamble 568 may accommodate transmit beamforming and MU-MIMO. The first part or portion 570 of the preamble 568 may be typically transmitted in an omnidirectional fashion (using cyclic diversity or another scheme, for example). However, according to the systems and methods disclosed herein, this first or omnidirectional part 570 may be beamformed. This first part 570 of the preamble 568 may include the L-STF 576, L-LTF 578, L-SIG 580, VHT-SIG-A1 582, VHT-SIG-A2 584 and VHT-SIG-A3 592. This first part 570 of the preamble 568 may be decodable by legacy devices (e.g., devices that comply with legacy or earlier specifications).

A second part or portion 572 of the preamble 568 may be transmitted in an omnidirectional fashion, may be beamformed or may be MU-MIMO precoded. This second part 572 of the preamble 568 includes the VHT-STF 586, one or more VHT-LTFs 588, and the VHT-SIG-B 590. The data symbols (in the data field 574, for example) may be transmitted with the same or different antenna pattern as the second part 572 of the preamble 568. The data field 574 may also be transmitted omnidirectionally, may be beamformed or may be MU-MIMO precoded. The data symbols and the second part 572 of the preamble 568 may not be decodable by legacy devices (or even by all 802.11ac devices, for example).

The preamble 568 may include some control data that is decodable by legacy 802.11a and 802.11n receivers. This control data is contained in the L-SIG 580. The data in the L-SIG 580 informs all receivers how long the transmission will occupy the wireless medium, so that all devices may defer their transmissions for an accurate amount of time. Additionally, the preamble 568 allows 802.11ac devices to distinguish the transmission as an 802.11ac transmission (and avoid determining that the transmission is in an 802.11a or 802.11n format). Furthermore, the preamble 568 may cause legacy 802.11a and 802.11n devices to detect the transmission as an 802.11a transmission, which is a valid transmission with valid data in the L-SIG 580.

In this example, the preamble 568 starts with a first or omnidirectional part 570 that may be used for an 802.11a-based legacy deferral and for conveying 802.11ac information such as the length of a downlink MU-MIMO packet and bandwidth. More specifically, the L-STF 576, L-LTF 578, L-SIG 580, VHT-SIG-A1 582, VHT-SIG-A2 584 and VHT-SIG-A3 592 may typically be transmitted in an omnidirectional fashion. However, according to the systems and methods disclosed herein, the first or omnidirectional part 570 may be beamformed. The preamble 568 may include all 802.11ac signaling information in the omnidirectional part 570, including a modulation and coding scheme (MCS) per downlink wireless communication device or client.

The preamble 568 may have the possibility to use resolvable Long Training Fields (LTFs) or unresolvable LTFs. For resolvable LTFs, for example, the number of LTF symbols per wireless communication device (e.g., client) 142 is equal to or larger than the total number of spatial streams 138 for all wireless communication devices (e.g., clients) 142. For unresolvable LTFs, for example, the number of LTF symbols per wireless communication device (e.g., client) 142 is equal to or larger than the number of spatial streams 138 per wireless communication device (e.g., client) 142.

With resolvable LTFs, the number of wireless communication devices (e.g., clients) 142 in a downlink MU-MIMO packet may be restricted to four in the preamble 568 illustrated. With unresolvable LTFs, the number of wireless communication devices (e.g., clients) 142 in a downlink MU-MIMO packet may be restricted to four in the preamble 568. For this preamble 568, the total number of streams for all downlink wireless communication devices (e.g., clients) 142 may not exceed eight.

Figure 6:
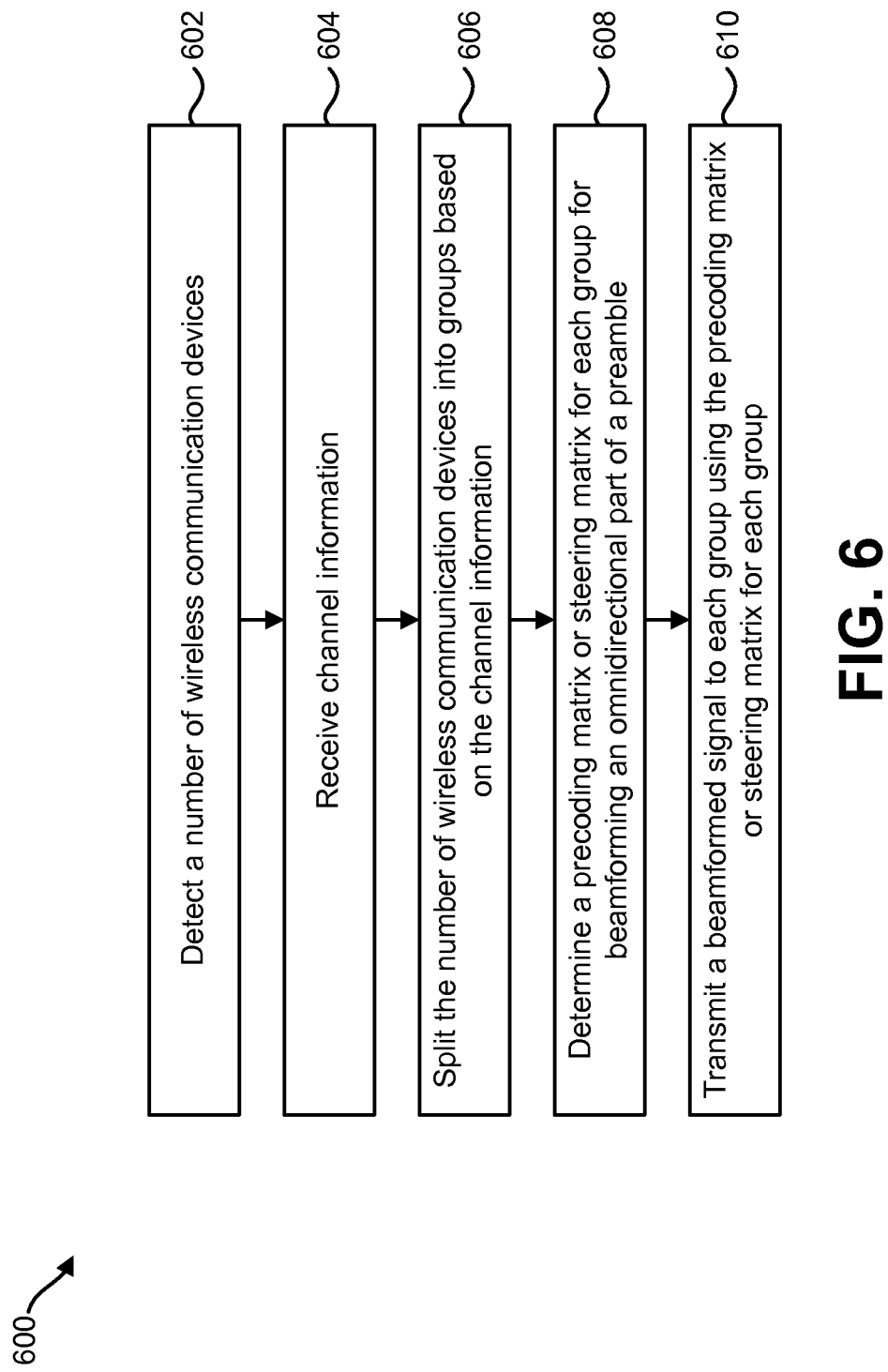
FIG. 6 is a flow diagram illustrating a more specific configuration of a method for multiple group communications.

FIG. 6 is a flow diagram illustrating a more specific configuration of a method 600 for multiple group communications. A base station 102 (e.g., transmitting communication device 102) may detect 602 a number of wireless communication devices 142. For example, the base station 102 may determine a number of wireless communication devices 142 based on signals received from the wireless communication devices 142, such as requests to access communication resources provided by the base station 102. For instance, one or more wireless communication devices 142 within communication range of the base station 102 may send a message to the base station 102 attempting to establish a link with or use resources provided by the base station 102. The base station 102 may keep a tally of identified wireless communication devices 142 in range that are attempting to communicate with the base station 102. This tally may be the number of wireless communication devices 142.

The base station 102 may receive 604 channel information. For example, the base station 102 may receive 604 channel information that may be used to determine a channel. One example of channel information is channel state information (CSI) according to IEEE 802.11 specifications. In one configuration, the base station 102 may receive 604 explicit channel feedback. For instance, the base station 102 may send training, sounding and/or pilot symbols to a wireless communication device 142. The wireless communication device 142 may determine channel information (e.g., CSI) based on the training, sounding and/or pilot symbols and send the channel information to the base station 102. In another configuration, the base station 102 may receive 604 implicit channel information. For example, a wireless communication device 142 may send a signal that the base station 102 can receive and use to determine a channel.

The base station 102 may split 606 the number of wireless communication devices 142 into groups based on the channel information. For example, the base station 102 may use received signals to determine a grouping of wireless communication devices 142. For instance, the base station 102 may use one or more of the approaches for determining groups described above in connection with FIG. 1. One or more additional or alternative considerations, such as spatial location, signal direction, group size, distance between angles, wireless communication device 142 capability, user preference, resource usage, etc., may be taken into account.

The base station 102 may determine 608 a precoding matrix for each group for beamforming. For example, the base station 102 may generate a precoding matrix for each group of wireless communication devices 142 in order to generate a beam for each group, where each beam carries a signal or set of signals corresponding to each group. For example, the base station 102 may generate the precoding matrix for each group of wireless communication devices 142. A precoding matrix may include weighting factors that weight transmissions for each antenna 132*a-n* of the base station 102. This may allow the base station 102 to steer transmitted signals in a particular spatial direction. A group precoding matrix may beamform signals such that a signal or set of signals may be sent to a particular group of wireless communication devices 142. For example, a first signal or set of signals may be sent to a first group of wireless communication devices 142 (using a first beam) while a second signal or set of signals may be sent to a second group of wireless communication devices 142 (using a second beam).

In some configurations, determining 608 a precoding matrix for each group may be done for beamforming an omnidirectional part of a preamble. An omnidirectional part of a preamble may be part of a preamble in a communication frame that is typically transmitted in an omnidirectional fashion. For example, the omnidirectional part 470, 570 of a preamble 468, 568 illustrated in FIG. 4 or FIG. 5 may be specified (by IEEE specifications, for example) to be transmitted omnidirectionally. However, an omnidirectional part 470, 570 of a preamble 468, 568 may instead be beamformed to be transmitted in two or more beams in accordance with the systems and methods disclosed herein.

The base station 102 may transmit 610 a beamformed signal to each group using the precoding matrix or steering matrix for each group. For example, the base station 102 may transmit 610 a signal or set of signals to each group of wireless communication devices 142 using each of the group precoding matrices. More specifically, antenna weighting factors from the precoding matrix for each group may be applied to electromagnetic signals that are then radiated from multiple base station 102 antennas 132a-n.

Figure 7:
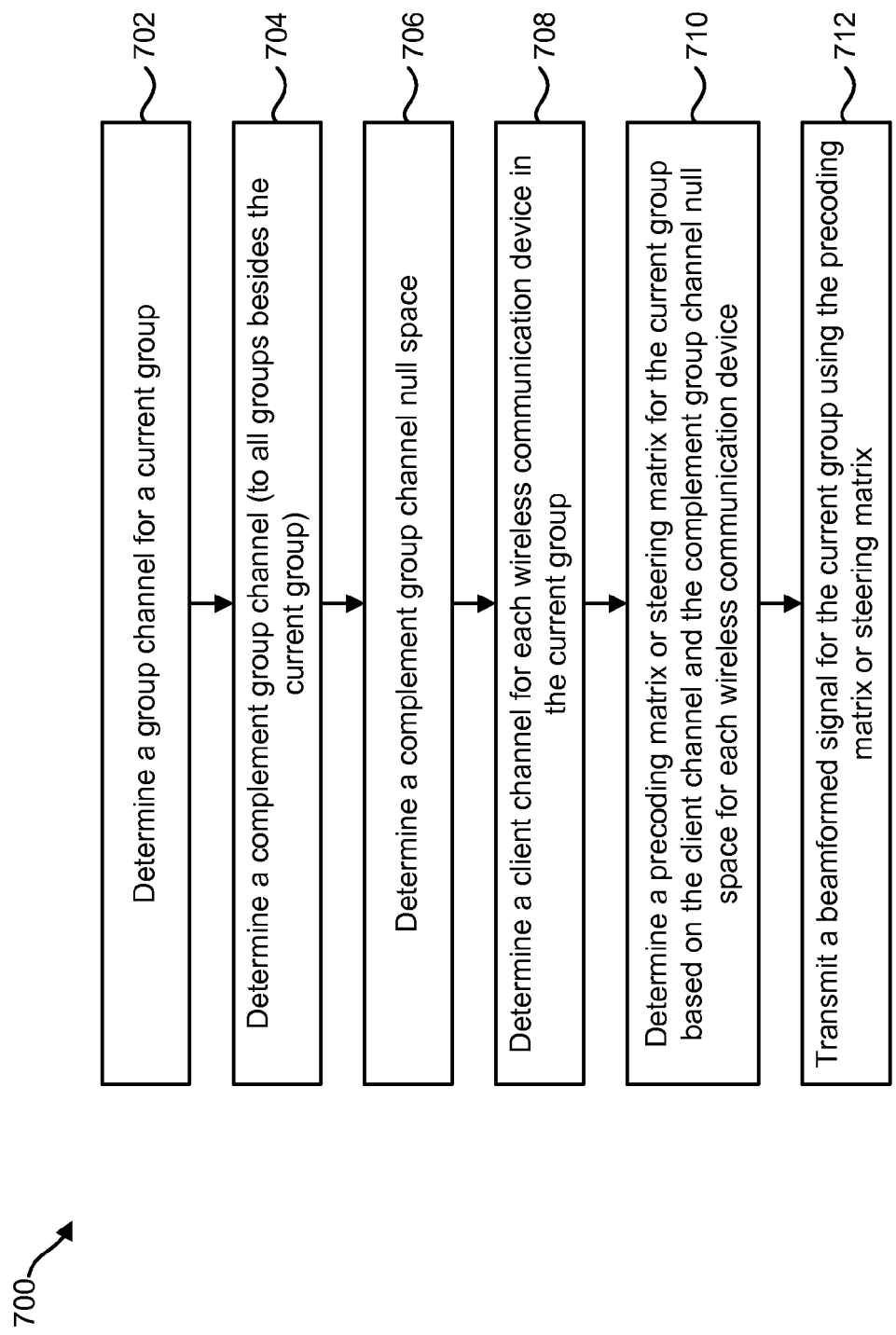
FIG. 7 is a flow diagram illustrating another more specific configuration of a method for multiple group communications.

FIG. 7 is a flow diagram illustrating another more specific configuration of a method 700 for multiple group communications. For example, FIG. 7 illustrates using multi-group block diagonalization. A base station 102 may determine 702 a group channel for a current group. For example, the base station 102 may receive a channel (denoted H) as explicit feedback from one or more wireless communication devices 142. Alternatively, the base station 102 may receive a signal from one or more wireless communication devices 142 that it 102 may use to determine a channel H. Using the channel H, the base station 102 may determine 702 a current group channel $H_k$. The channel to group k may comprise $N_{rxk}$ rows and $N_{tx}$ columns of H. $N_{rxk}$ is a total number of receivers in group k and $N_{tx}$ is a number of base station (e.g., access point) transmitters.

The base station 102 may determine 704 a complement group channel $H_k'$. The complement group channel $H_k'$ may be the channel to all groups except group k. That is, $H_k'$ may comprise $N_{rxt}-N_{rxk}$ rows and $N_{tx}$ columns of H, where $N_{rxt}$ is a total number of wireless communication device (e.g., client) receivers.

The base station 102 may determine 706 a complement group channel null space $V_n$. For example, the base station 102 may calculate or compute a singular value decomposition on the complement group channel as illustrated in Equation (3).

$$[U',S',V']=svd(H_k') \quad (3)$$

In Equation (3), U' includes the left singular vectors of $H_k'$, S' are the singular values of $H_k'$ and V' includes the right singular vectors of $H_k'$. The complement group channel null space $V_n$ is the null space of the complement group channel $H_k'$ or the last $N_{tx}-(N_{rxt}-N_{rxk})$ columns of V'.

The base station 102 may determine 708 a client channel $H_{mk}$ for each wireless communication device in the current group (e.g., for m=1 to $N_{ck}$). For example, for m=1 to $N_{ck}$, the base station 102 may determine 708 the channel $H_{mk}$ to wireless communication device (e.g., client) m in the current group (k). A client channel $H_{mk}$ may comprise $N_{rxmk}$ rows and $N_{tx}$ columns of H, where $N_{rxmk}$ is a number of receivers of wireless communication device (e.g., client) m in group k.

The base station 102 may determine 710 a precoding matrix or steering matrix for the current group based on the client channel $H_{mk}$ and the complement group channel null space $V_n$ for each wireless communication device 142 (e.g., for m=1 to $N_{ck}$). This may be accomplished in several ways. In a first example, the precoding matrix $W_k$ for the current group may be determined according to Equations (4) and (5).

$$[U_m,S_m,V_m]=svd(H_{mk}V_n) \quad (4)$$

In Equation (4), $U_m$ includes the left singular vectors of $H_{mk}V_n$, $S_m$ are the singular values of $H_{mk}V_n$ and $V_m$ includes the right singular vectors of $H_{mk}V_n$.

$$W_k(L,m)=V_m(:,1)S_m^{-1}(1,1) \quad (5)$$

In Equations (4) and (5), m is an index number of wireless communication devices or clients 142 and k is a group index number. In one configuration, the precoding matrix $W_k$ illustrated in Equation (5) may only be applied to the first or omnidirectional part of the preamble. For example, the precoding matrix $W_k$ illustrated in Equation (5) may only be applied in a preamble 468, 568 up to and including VHT-SIG-A, such as VHT-SIG-A2 484 or VHT-SIG-A3 592.

In a second example of determining 710 a precoding matrix, the precoding matrix $W_{km}$ for the current group may be determined according to Equations (6), (7) and (8). This second example may use minimum mean-square error eigenmode selection within a group.

$$[U_m,S_m,V_m]=svd(H_{mk}V_n) \quad (6)$$

In Equation (6), $U_m$ includes the left singular vectors of $H_{mk}V_n$, $S_m$ are the singular values of $H_{mk}V_n$ and $V_m$ includes the right singular vectors of $H_{mk}V_n$.

$$Z(:,(m-1)N_{ssmk}+1:m*N_{ssmk})=V_m(:,1:N_{ssmk})S_m$$
$$(1:N_{ssmk},1:N_{ssmk}) \quad (7)$$

In Equation (7), m is an index number of wireless communication devices or clients, k is a group index number and $N_{ssmk}$ is a number of spatial streams of wireless communication device 142 (e.g., client) m in group k. Z is a matrix comprising selected eigenmodes. Interference between these eigenmodes may be reduced or minimized by applying Equation (8).

$$W_{km} = \left(ZZ^H + \left(\frac{1}{SNR_k}\right)I\right)^{-1}Z \quad (8)$$

In Equation (8), the superscript $H$ denotes a conjugate transpose or Hermitian transpose, I is an identity matrix and $SNR_k$ is an estimate of average signal-to-noise ratio (SNR) in downlink for group k.

In one configuration, the precoding matrix $W_{km}$ for group k illustrated in Equation (8) may be applied to the second part of a preamble and/or remaining part of a packet or frame. It should be noted that if precoding is done to multiple groups, then precoding may need to be applied to an entire packet including the entire preamble. For example, the precoding matrix $W_{km}$ illustrated in Equation (8) may be applied to a frame 400, 500 starting from a VHT-STF 486, 586. Additionally or alternatively, the precoding matrix $W_k$ illustrated in Equation (5) may only be applied to the first part of the preamble 468, 568 up to and including VHT-SIG-A, such as VHT-SIG-A2 484 or VHT-SIG-A3 592. Thus, determining 710 a precoding matrix may include determining a precoding matrix $W_k$ as illustrated in Equation (5) for the first part of a preamble and also determining a precoding matrix $W_{km}$ as illustrated in Equation (8) for the remainder of a frame or packet in one configuration.

It should be noted that a difference between the first example of the precoding (for the first part of the preamble, for example) and the second example of the precoding is that no attempt is made to cancel multi-user interference within a group in the first example. For instance, there may be no need for this as all data is identical for all wireless communication devices (e.g., clients) 142 in the same group for the first part 470, 570 of the preamble 468, 568 (e.g., up to the VHT-STF 486, 586).

In one configuration, however, the first part 470, 570 of the preamble 468, 568 may be precoded identical to the second part. For example, interference may be canceled between spatial streams within a group even though a wireless communication device (e.g., client) 142 cannot distinguish between spatial streams 138 before receiving the second and/or remaining part (e.g., the VHT-LTFs, etc.). If a wireless communication device (e.g., client) 142 has more than one spatial stream 138, the single stream 138 of the first part 470, 570 of the preamble 468, 568 may be copied to all stream inputs of that wireless communication device (e.g., client) 142. The first part 470, 570 of the preamble 468, 568 may still be decoded by all wireless communication devices (e.g. clients) 142 as every spatial stream 138 contains the same information. This approach may actually be preferable since it requires only a single precoding matrix per packet instead of two different precoding matrices.

A third example of determining 710 a precoding matrix $W_{km}$ follows. This third example may use multi-group block diagonalization with multi-user eigenmode transmission (MET). As noted above, the previous algorithm applied minimum mean-square error eigenmode selection within a group. One alternative is to use multi-user eigenmode transmission (MET) within a group. It should be noted that the minimum mean-square error eigenmode selection is simpler and may have better performance than this third example. Determining 710 a precoding matrix according to this third example is illustrated in Equations (9), (10), (11), (12), (13) and (14).

$$[U_m, S_m, V_m] = svd(H_{mk} V_n) \quad (9)$$

In Equation (9), $U_m$ includes the left singular vectors of $H_{mk}V_n$, $S_m$ are the singular values of $H_{mk}V_n$ and $V_m$ includes the right singular vectors of $H_{mk}V_n$.

$$D_m = V_m(:, 1:N_{ssmk}) S_m(1:N_{ssmk}, 1:N_{ssmk}) \quad (10)$$

In Equation (10), m is an index number of wireless communication devices or clients 142, k is a group index number and $N_{ssmk}$ is a number of spatial streams of wireless communication device 142 (e.g., client) m in group k. $D_m$ is a steering vector for wireless communication device 142 (e.g., client) m.

$$Z = [D_1 D_{m-1} D_{m+1} D_{N_{ck}}]^H \quad (11)$$

In Equation (11), Z is a matrix of steering vectors to all wireless communication devices 142 (e.g., clients) in group k besides wireless communication device 142 (e.g., client) m. The superscript $^H$ denotes a conjugate transpose or Hermitian transpose.

$$[U_{mz}, S_{mz}, V_{mz}] = svd(Z) \quad (12)$$

In Equation (12), $U_{mz}$ includes the left singular vectors of Z, $S_{mz}$ are the singular values of Z and $V_{mz}$ includes the right singular vectors of Z.

$$[U,S,V] = svd(D_m^H V_{mz}(:, N_{ssk}-N_{ssmk}+1:N_{ssk})) \quad (13)$$

In Equation (13), U includes the left singular vectors of $D_m^H V_{mz}(:, N_{ssk}-N_{ssmk}+1:N_{ssk})$, S are the singular values of $D_m^H V_{mz}(:, N_{ssk}-N_{ssmk}+1:N_{ssk})$ and V includes the right singular vectors of $D_m^H V_{mz}(:, N_{ssk}-N_{ssmk}+1:N_{ssk})$. $N_{ssk}$ is a number of spatial streams for group k.

$$W_{km} = V_{mz}(:, N_{ssk}-N_{ssmk}) V \left( \left( \frac{I_{N_{ssmk}}}{SNR_k} \right) + S \right)^{-1} \quad (14)$$

In Equation (14), $W_{km}$ is a precoding matrix or steering matrix for wireless communication device 142 (e.g., client) m in group k and $I_{N_{ssmk}}$ is an identity matrix with $N_{ssmk}$ rows and columns. It should be noted that the terms "precoding matrix" and "steering matrix" may be synonymous.

In a fourth example, flexible multi-group block diagonalization may be used in accordance with the systems and methods disclosed herein. In this example, assume that for a wireless communication device 142 (e.g., client) c in group k, the base station (e.g., AP) 102 only gets a beamforming matrix and average signal-to-noise ratio (SNR) per stream, where wireless communication device 142 (e.g., client) c obtained the beamforming matrix $V_c''(:,1:N_{ssck})$ through $[U_c'', S_c'', V_c''] = svd(H_{ck})$, for example, while the other wireless communication device(s) (e.g., clients) 142 fed back channel state information $H_{mk}$. In this case, the base station (e.g., AP) 102 may set $H_{ck}$ to $V_c''(:,1:N_{ssck})^H$ (as well as the corresponding part in $H_k$), where $H_{ck}$ is the channel for wireless communication device 142 (e.g., client) c in group k and $N_{ssck}$ is a number of spatial streams 138 for wireless communication 142 (e.g., client) c in group k. The rest of the processing may be performed the same as the previously described multi-group block diagonalization procedures described in the examples above (e.g., Equations (4) through (14) or in Listing (1), Listing (2) and/or Listing (3) above). For example, suppose that the procedure illustrated in Listing (1) above is used, then wireless communication device 142 (e.g., client) c may apply dedicated spatial filtering at its receive side to recover its data as illustrated in Equation (15).

$$U_c^H S_c''^{-1}(1:N_{ssck}, 1:N_{ssck}) * U_c''^H \quad (15)$$

In Equation (15), $U_c$ is given in Listing (1) for wireless communication device 142 (e.g., client) m=c. Alternatively, depending on the MU-MIMO technique used, the receiver may do any other type of MIMO processing or interference suppression (assuming that proper channel estimation is done, for example).

In a fifth example, flexible multi-group block diagonalization may be used in accordance with the systems and methods disclosed herein. In this example, assume that for wireless communication device 142 (e.g., client) c in group k, the base station (e.g., AP) 102 only gets the beamforming matrix and singular values, where wireless communication device 142 (e.g., client) c obtained the beamforming matrix $V_c''(:, 1:N_{ssck})$ and singular values $S_c''(1:N_{ssck}, 1:N_{ssck})$ through $[U_c'', S_c'', V_c''] = svd(H_{ck})$, for example, while the other wireless communication devices (e.g., clients) 142 fed back the channel state information $H_{mk}$. In this case, the base station (e.g., AP) 102 may set $H_{ck}$ to $S_c''(1:N_{ssck}, 1:N_{ssck})V_c''(:,1:N_{ssck})^H$ (as well the corresponding part in $H_k$). The rest of the processing may be performed the same as the previously described examples (e.g., Equations (4) through (14) or in Listing (1), Listing (2) and/or Listing (3) above). For example, suppose that the procedure illustrated in Listing (1) above is used, then wireless communication device 142 (e.g., client) c may apply dedicated spatial filtering at its receive side to recover its data as illustrated in Equation (16).

$$H_c^H * U_c''^H \quad (16)$$

In Equation (16), $U_c$ is given in Listing (1) for wireless communication device 142 (e.g., client) m=c. Alternatively, depending on the MU-MIMO technique used, the receiver may do any other type of MIMO processing or interference suppression (assuming that proper channel estimation is done, for example).

The base station 102 may transmit 712 a beamformed signal for the current group using the precoding matrix or steering matrix. For example, the base station 102 may apply weights to the antennas 132a-n from the precoding matrix or steering matrix to signals that are transmitted from each of the antennas 132a-n.

It should be noted that one or more of the steps 702, 704, 706, 708, 710 and/or 712 illustrated in FIG. 7 may be repeated for each group in a number of groups $N_G$. For example, a base station 102 may repeat the steps 702, 704, 706, 708 and 710 for k=1 to $N_G$.

Figure 8:
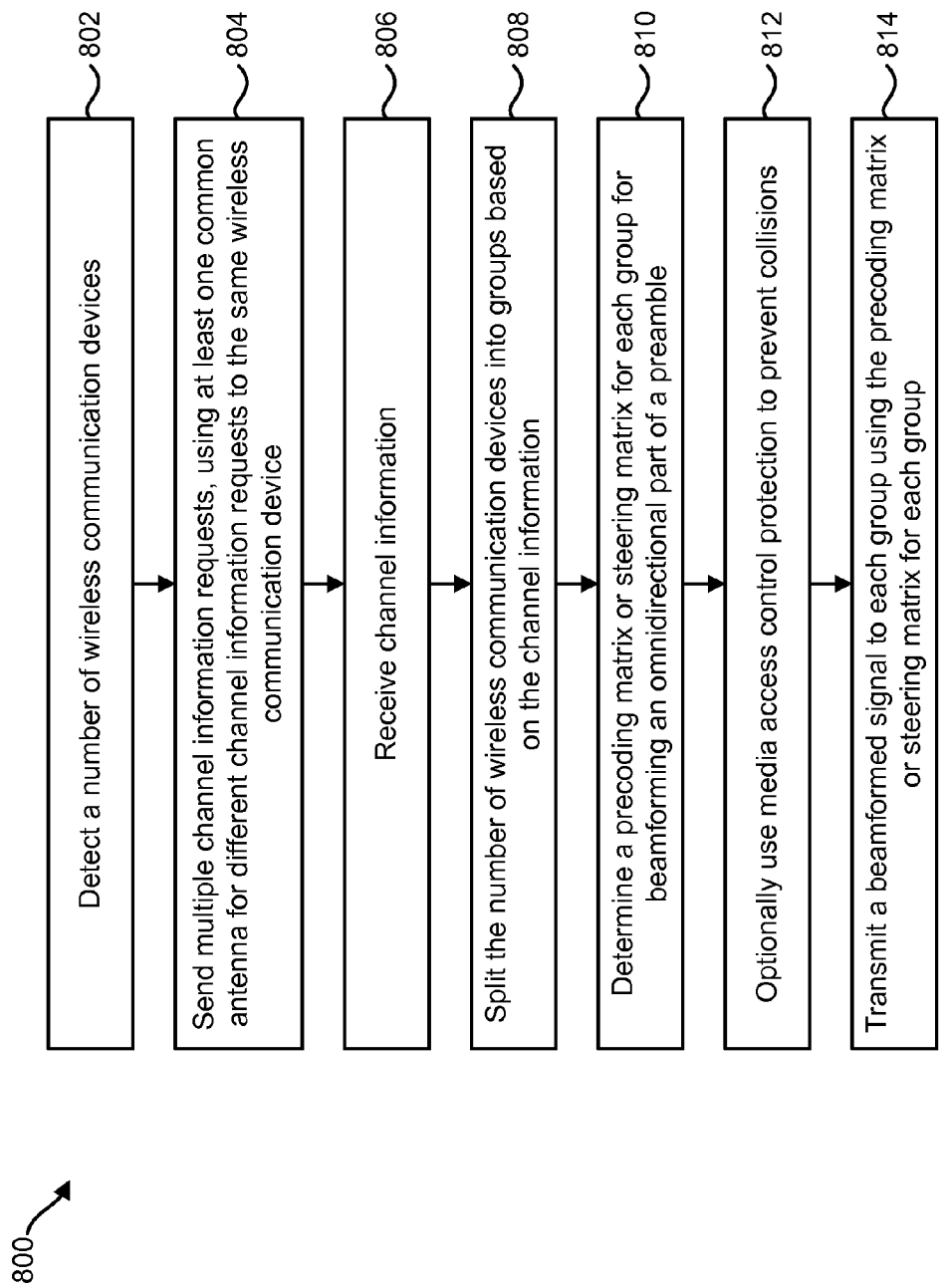
FIG. 8 is a flow diagram illustrating another more specific configuration of a method for multiple group communications.

FIG. 8 is a flow diagram illustrating another more specific configuration of a method 800 for multiple group communications. A base station 102 may detect 802 a number of wireless communication devices 142. For example, the base station 102 may determine a number of wireless communication devices 142 based on signals received from the wireless communication devices 142, such as requests to access communication resources provided by the base station 102. For instance, one or more wireless communication devices 142 within communication range of the base station 102 may send a message to the base station 102 attempting to establish a link with or use resources provided by the base station 102. The base station 102 may keep a tally of identified wireless communication devices 142 in range that are attempting to communicate with the base station 102. This tally may be the number of wireless communication devices 142.

The base station 102 may send 804 multiple channel information (e.g., channel state information or CSI) requests. In sending 804 the multiple channel information requests, the base station 102 may use at least one common antenna 132 for different channel information requests to the same wireless communication device 142.

In one configuration, channel state information (CSI) feedback may be used. CSI feedback may be limited to eight antennas in 802.11ac. A base station (e.g., access point or AP) 102 with more than eight antennas 132a-n may need to send 804 multiple feedback requests to get the channel on all of its antennas 132a-n.

For up to 15 base station (e.g., AP) 102 transmit antennas 132a-n, one example of a procedure using channel state information is described as follows. The base station 102 may send 804 a channel state information (CSI) request for every wireless communication device (e.g., client) 142 twice, each time transmitting from no more than eight antennas 132 (all other antennas transmit nothing, for example). Different channel state information (CSI) requests to the same wireless communication device (e.g., client) 142 may need to contain at least one common transmit antenna 132. This may be needed to remove the phase shift occurring between two different channel state information feedbacks. In one configuration, multiple channel state information messages (e.g., CSI feedback) may be received (which is described below). Different (e.g., multiple) channel state information feedback (e.g., messages) may be combined by normalizing all channels by the channel values for a common transmit antenna 132 such that the values for the common antenna 132 become equal (e.g., matched).

For more than 15 antennas 132, the above procedure may be extended to three or more channel state information (CSI) requests, all with at least one common reference antenna 132. The above procedure may also be used in groups of four antennas 132 such that the existing 802.11n channel state information feedback can be used, which may be limited to a maximum of four transmitters.

The base station 102 may receive 806 channel information. For example, the base station 102 may receive 806 channel information that may be used to determine a channel. In one configuration, the base station 102 may receive one or more (e.g., multiple) channel state information messages from the same wireless communication device 142. One example of channel information is channel state information (CSI) according to IEEE 802.11 specifications. In one configuration, the base station 102 may receive 806 explicit channel feedback. For instance, the base station 102 may send training, sounding and/or pilot symbols to a wireless communication device 142. The wireless communication device 142 may determine channel information (e.g., CSI) based on the training, sounding and/or pilot symbols and send the channel information to the base station 102. In another configuration, the base station 102 may receive 806 implicit channel information. For example, a wireless communication device 142 may send a signal that the base station 102 can receive and use to determine a channel.

The base station 102 may split 808 the number of wireless communication devices 142 into groups based on the channel information. For example, the base station 102 may use received signals to determine a grouping of wireless communication devices 142. In some configurations, the grouping may be determined using one or more of the approaches described above in connection with FIG. 1.

The base station 102 may determine 810 a precoding matrix or steering matrix for each group for beamforming. For example, the base station 102 may generate a precoding matrix for each group of wireless communication devices 142 in order to generate a beam for each group, where each beam carries a signal or set of signals corresponding to each group. For example, the base station 102 may generate the precoding matrix for each group of wireless communication devices 142. A precoding matrix may include weighting factors that weight transmissions for each antenna 132a-n of the base station 102. This may allow the base station 102 to steer transmitted signals in a particular spatial direction. A group precoding matrix may beamform signals such that a signal or set of signals may be sent to a particular group of wireless communication devices 142. For example, a first signal or set of signals may be sent to a first group of wireless communication devices 142 (using a first beam) while a second signal or set of signals may be sent to a second group of wireless communication devices 142 (using a second beam).

In some configurations, determining 810 a precoding matrix for each group may be done for beamforming an omnidirectional part of a preamble. An omnidirectional part of a preamble may be part of a preamble in a communication frame that is typically transmitted in an omnidirectional fashion. For example, the omnidirectional part 470, 570 of a preamble 468, 568 illustrated in FIG. 4 or FIG. 5 may be specified (by IEEE specifications, for example) to be transmitted omnidirectionally. However, an omnidirectional part 470, 570 of a preamble 468, 568 may instead be beamformed to be transmitted in two or more beams in accordance with the systems and methods disclosed herein.

The base station 102 may optionally use 812 media access control protection to prevent collisions. More specifically, media access control (MAC) protection may be used to prevent collisions from wireless communication devices (e.g., stations) 142. For example, a separate clear to send (CTS) signal may be sent prior to the downlink MU-MIMO packet. This CTS signal may notify the wireless communication devices 142 that a particular wireless communication device 142 may transmit a signal to the base station 102. Other wireless communication devices 142 besides the one designated to send may wait to transmit signals until after a given period.

The base station 102 may transmit 814 a beamformed signal to each group using the precoding matrix or steering matrix for each group. For example, the base station 102 may transmit 814 a signal or set of signals to each group of wireless communication devices 142 using each of the group precoding matrices. More specifically, antenna weighting factors from the precoding matrix for each group may be applied to electromagnetic signals that are then radiated from multiple base station 102 antennas 132*a-n*.

Figure 9:
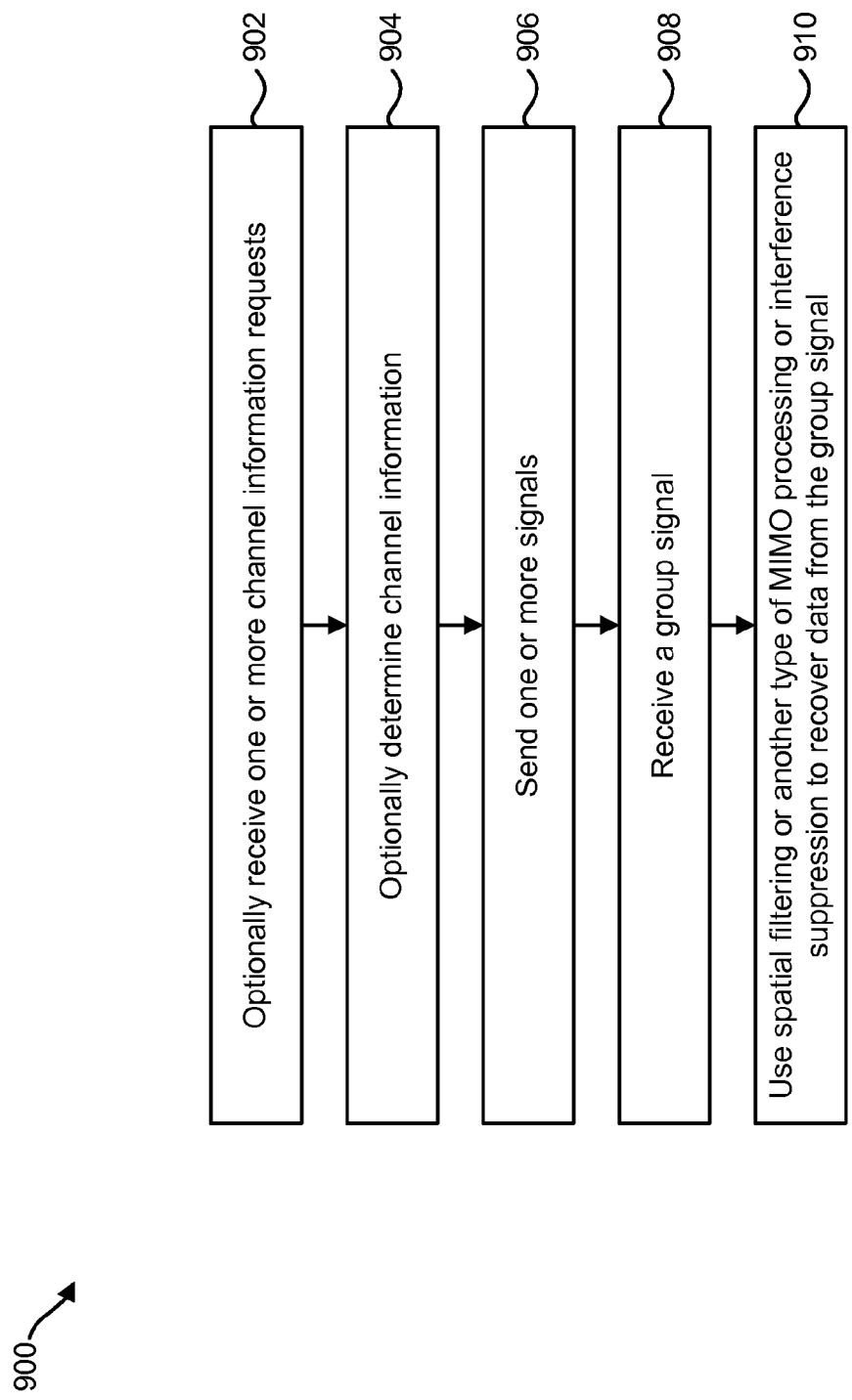
FIG. 9 is a flow diagram illustrating one configuration of a method for receiving group communications.

FIG. 9 is a flow diagram illustrating one configuration of a method 900 for receiving group communications. A wireless communication device 142 may optionally receive 902 one or more channel information requests. For example, a wireless communication device 142 may receive one or more channel state information (CSI) requests from a base station 102. For instance, a wireless communication device 142 may receive training symbols, pilot symbols and/or sounding signals.

The wireless communication device 142 may optionally determine 904 channel information. For example, the wireless communication device 142 may use received training symbols, pilot symbols and/or sounding signals to determine channel (e.g., feedback) information (e.g., a channel matrix).

The wireless communication device 142 may send 906 one or more signals. In one configuration, the wireless communication device 142 may send 906 channel information (e.g., feedback information) determined 904 based on one or more signals received from the base station 102. Additionally or alternatively, the wireless communication device 142 may send a request to communicate with the base station 102. For instance, the wireless communication device 142 may send a message to the base station 102 indicating that the wireless communication device 142 is attempting to communicate with and/or use resources of the base station 102. In some configurations, the one or more signals sent 906 to the base station 102 may be used by the base station 102 to determine channel information.

The wireless communication device 142 may receive 908 a group signal. For example, the wireless communication device 142 may receive 908 a beamformed signal transmitted from the base station 102 that includes information for a group of wireless communication devices 142.

The wireless communication device 142 may use 910 spatial filtering or another type of MIMO processing or interference suppression to recover data from the group signal. In one configuration, flexible multi-group block diagonalization may be used in accordance with the systems and methods disclosed herein. In this example, assume that for a wireless communication device 142 (e.g., client) c in group k, the base station (e.g., AP) 102 only gets a beamforming matrix and average signal-to-noise ratio (SNR) per stream, where wireless communication device 142 (e.g., client) c obtained the beamforming matrix $V_c''(:,1: N_{ssck})$ through $[U_c'', S_c'', V_c'']=svd(H_{ck})$, for example, while the other wireless communication device(s) (e.g., clients) 142 fed back channel state information $H_{mk}$. In this case, the base station (e.g., AP) 102 may set $H_{ck}$ to $V_c''(:,1: N_{ssck})^H$ (as well as the corresponding part in $H_k$), where $H_{ck}$ is the channel for wireless communication device (e.g., client) c in group k and $N_{ssck}$ is a number of spatial streams for wireless communication (e.g., client) c in group k. The rest of the processing may be performed the same as the previously described multi-group block diagonalization procedures described in the examples above (e.g., Equations (4) through (14) or in Listing (1), Listing (2) and/or Listing (3) above). For example, suppose that the procedure illustrated in Listing (1) above is used, then wireless communication device 142 (e.g., client) c may use 910 dedicated spatial filtering at its 142 receive side to recover its 142 data as illustrated in Equation (15) above.

In Equation (15), $U_c$ is given in Listing (1) for wireless communication device 142 (e.g., client) m=c. Alternatively, depending on the MU-MIMO technique used, the wireless communication device 142 may use 910 any other type of MIMO processing or interference suppression (assuming that proper channel estimation is done, for example).

In another configuration, flexible multi-group block diagonalization may be used in accordance with the systems and methods disclosed herein. In this configuration, assume that for wireless communication device 142 (e.g., client) c in group k, the base station (e.g., AP) 102 only gets the beamforming matrix and singular values, where wireless communication device 142 (e.g., client) c obtained the beamforming matrix $V_c''(:,1: N_{ssck})$ and singular values $S_c''(1: N_{ssck}, 1: N_{ssck})$ through $[U_c'', S_c'', V_c'']=svd(H_{ck})$, for example, while the other wireless communication devices (e.g., clients) 142 fed back the channel state information $H_{mk}$. In this case, the base station (e.g., AP) 102 may set $H_{ck}$ to $S_c''(1: N_{ssck}, 1: N_{ssck})V_c''(:,1: N_{ssck})^H$ (as well the corresponding part in $H_k$). The rest of the processing may be performed the same as the previously described examples (e.g., Equations (4) through (14) or in Listing (1), Listing (2) and/or Listing (3) above). For example, suppose that the procedure illustrated in Listing (1) above is used, then wireless communication device 142 (e.g., client) c may use 910 dedicated spatial filtering at its 142 receive side to recover its data as illustrated in Equation (16) above.

In Equation (16), $U_c$ is given in Listing (1) for wireless communication device 142 (e.g., client) m=c. Alternatively, depending on the MU-MIMO technique used, the wireless communication device 142 may use 910 any other type of MIMO processing or interference suppression (assuming that proper channel estimation is done, for example).

Figure 10:
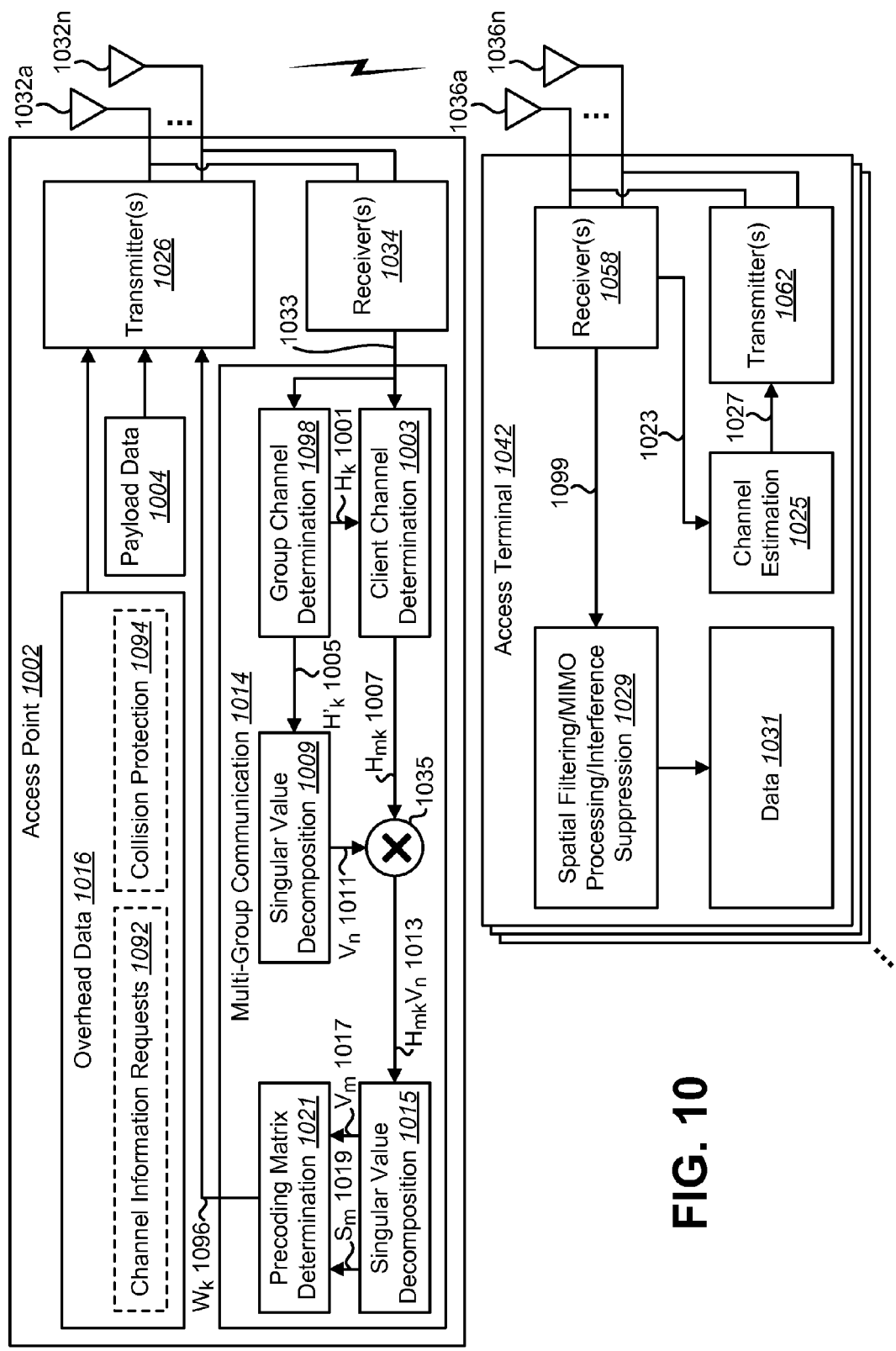
FIG. 10 is a block diagram illustrating one configuration of an access point and access terminals wherein systems and methods for multiple group communications may be implemented.

FIG. 10 is a block diagram illustrating one configuration of an access point 1002 and access terminals 1042 wherein systems and methods for multiple group communications may be implemented. The access point 1002 may be one example of the transmitting communication device 102 illustrated in FIG. 1. The access terminals 1042 may be one example of the receiving communication devices 142 illustrated in FIG. 1.

The access point 1002 may include overhead data 1016, payload data 1004, one or more transmitters 1026, one or more receivers 1034 and/or a multi-group communication block/module 1014. The payload data 1004 may include voice, video, audio and/or other data. The overhead data 1016 may include control information, such as information that specifies a data rate, modulation and coding scheme (MCS), channel bandwidth, frame length, defer periods, collision protection information 1094 (e.g., media access control (MAC) information, clear to send (CTS) information, etc.) and/or channel information requests (e.g., channel state information (CSI) requests) 1092, etc.

The one or more transmitters 1026 may output radio frequency (RF) signals to one or more antennas 1032*a-n*, thereby transmitting the data 1004, 1016 over a wireless medium suitably configured for receipt by one or more access terminals 1042. The access point 1002 may also include one or more receivers 1034. The one or more receivers 1034 may be used to receive signals from the one or more access terminals 1042.

The access point 1002 may detect a number of access terminals 1042. For example, the access point 1002 may determine a number of access terminals 1042 based on signals received from the access terminals 1042, such as requests to access communication resources provided by the access point 1002 or feedback information. For instance, one or more access terminals 1042 within communication range of the access point 1002 may send a message to the access point 1002 using one or more transmitters 1062 attempting to establish a link with or use resources provided by the access point 1002. The access point 1002 may keep a tally of identified access terminals 1042 in range that are attempting to communicate with the access point 1002. This tally may be the number of access terminals 1042.

In some configurations, the access point 1002 may send multiple channel information (e.g., channel state information or CSI) requests 1092. In sending the multiple channel information requests 1092, the access point 1002 may use at least one common antenna 1032 for different channel information requests to the same access terminal 1042.

An access terminal 1042 may optionally receive one or more channel information requests 1092. For example, an access terminal 1042 may receive one or more channel state information (CSI) requests 1092 from an access point 1002. More specifically, an access terminal 1042 may receive training symbols, pilot symbols and/or sounding signals. In one configuration, the access point 1002 may transmit pilot and/or training symbols with a channel information request 1092 to one or more access terminals 1042. The one or more access terminals 1042 may receive the pilot and/or training symbols using one or more receivers 1058.

The access terminal 1042 may optionally determine channel information 1027. For example, the access terminal 1042 may use received training symbols, pilot symbols and/or sounding signals to determine channel (e.g., feedback) information (e.g., a channel matrix) 1027. In one configuration, the one or more receivers 1058 may provide the received pilot and/or training symbols 1023 to a channel estimation block/module 1025, which may use them to estimate a channel. For instance, the channel estimation block/module 1025 may detect phase and/or frequency offsets in the received pilot and/or training symbols, which may be indicated in the estimated channel 1027. The estimated channel 1027 may be provided to one or more transmitters 1062.

The access terminal 1042 may send one or more signals. In one configuration, the access terminal 1042 may transmit the estimated channel 1027 as a feedback message (e.g., channel state information (CSI) feedback) to the access point 1002, which may receive the feedback message using its 1002 one or more receivers 1034. Additionally or alternatively, the access terminal 1042 may send a request to communicate with the access point 1002. For instance, the access terminal 1042 may send a message to the access point 1002 indicating that the access terminal 1042 is attempting to communicate with and/or use resources of the access point 1002. In some configurations, the one or more signals sent to the access point 1002 may be used by the access point 1002 to determine channel information. For instance, the access point 1002 may not receive explicit feedback messages from the one or more access terminals 1042, but may use other signals or messages received from the one or more access terminals 1042 by the one or more receivers 1034 to estimate a channel. The estimated channel 1033 may be provided to the multi-group communication block/module 1014.

The access point 1002 may split the number of access terminals 1042 into groups based on the channel information. For example, the access point 1002 may use received signals to determine a grouping of access terminals 1042. In some configurations, the grouping may be determined using one or more of the approaches described above in connection with FIG. 1.

The access point 1002 may determine a precoding matrix 1096 or steering matrix 1096 for each group for beamforming. For example, the access point 1002 may generate a precoding matrix 1096 for each group of access terminals 1042 in order to generate a beam for each group, where each beam carries a signal or set of signals corresponding to each group. For instance, the access point 1002 may generate the precoding matrix 1096 for each group of access terminals 1042. A precoding matrix 1096 may include weighting factors that weight transmissions for each antenna 1032a-n of the access point 1002. This may allow the access point 1002 to steer transmitted signals in a particular spatial direction. A group precoding matrix 1096 may beamform signals such that a signal or set of signals may be sent to a particular group of access terminals 1042. For example, a first signal or set of signals may be sent to a first group of access terminals 1042 (using a first beam) while a second signal or set of signals may be sent to a second group of access terminals 1042 (using a second beam).

In some configurations, determining a precoding matrix for each group may be done for beamforming an omnidirectional part of a preamble. An omnidirectional part of a preamble may be part of a preamble in a communication frame that is typically transmitted in an omnidirectional fashion. For example, the omnidirectional part 470, 570 of a preamble 468, 568 illustrated in FIG. 4 or FIG. 5 may be specified (by IEEE specifications, for example) to be transmitted omnidirectionally. However, an omnidirectional part 470, 570 of a preamble 468, 568 may instead be beamformed to be transmitted in two or more beams in accordance with the systems and methods disclosed herein.

As noted above, the access point 1002 includes a multi-group communication block/module 1014. In one configuration, the multi-group communication block/module 1014 may include a group channel determination block/module 1098, a client channel determination block/module 1003, a first singular value decomposition block/module 1009, a matrix multiplier 1035, a second singular value decomposition block/module 1015 and/or a precoding matrix determination block/module 1021. In one configuration, the group channel determination block/module 1098 may determine a group channel 1001 for a current group. For example, the group channel determination block/module 1098 may receive a channel (denoted H) 1033 as explicit feedback from one or more access terminals 1042. Alternatively, the access point 1002 may receive a signal from one or more access terminals 1042 that it 1002 may use to determine a channel H 1033.

Using the channel H 1033, the group channel determination block/module 1098 may determine a current group channel $H_k$ 1001. The channel 1001 to group k may comprise $N_{rck}$ rows and $N_{tx}$ columns of H. The group channel determination block/module 1098 may determine a complement group channel $H_k'$ 1005. The complement group channel $H_k'$ 1005 may be the channel to all groups except group k.

The first singular value decomposition block/module 1009 may determine a complement group channel null space $V_n$ 1011. For example, the first singular value decomposition block/module 1009 may calculate or compute a singular value decomposition on the complement group channel as illustrated in Equation (3) above. The complement group channel null space $V_n$ 1011 is the null space of the complement group channel $H_k'$ 1005.

The client channel determination block/module 1003 may determine a client channel $H_{mk}$ 1007 for each access terminal in the current group (e.g., for m=1 to $N_{ck}$). For example, for m=1 to $N_{ck}$, the client channel determination block/module 1003 may determine the channel $H_{mk}$ 1007 to access terminal (e.g., client) m in the current group (k). A client channel $H_{mk}$ 1007 may comprise $N_{rxmk}$ rows and $N_{tx}$ columns of H, where $N_{rxmk}$ is a number of receivers 1058 of access terminal 1042 (e.g., client) m in group k.

The multi-group communication block/module 1014 may determine a precoding matrix 1096 or steering matrix 1096 for the current group based on the client channel $H_{mk}$ 1007 and the complement group channel null space $V_n$ 1011 for each access terminal 1042 (e.g., for m=1 to $N_{ck}$). This may be accomplished in several ways. In the configuration illustrated in FIG. 10, the matrix multiplier 1035 may multiply the client channel $H_{mk}$ 1007 and the complement group channel null space $V_n$ 1011. The product $H_{mk}V_n$ 1013 may be provided to the second singular value decomposition block/module 1015.

The second singular value decomposition block/module 1015 may produce $S_m$ 1019 (e.g., the singular values of $H_{mk}V_n$ 1013) and $V_m$ 1017 (which includes the right singular vectors of $H_{mk}V_n$ 1013, for example). This may be done as illustrated in Equation (4), Equation (6) or Equation (9) above, for instance.

$S_m$ 1019 and $V_m$ 1017 may be provided to the precoding matrix determination block/module 1021. In one configuration, the precoding matrix determination block/module 1021 may determine the precoding matrix or steering matrix 1096 as illustrated in Equation (5) above. In another configuration, the precoding matrix determination block/module 1021 may determine the precoding matrix or steering matrix 1096 as illustrated in Equations (7) and (8) above. In some configurations, the precoding matrix determination block/module 1021 may determine the precoding matrix or steering matrix 1096 as illustrated in Equation (5) for a first part (e.g., omnidirectional part) of a preamble and may determine the precoding matrix or steering matrix 1096 as illustrated in Equations (7) and (8) for a second part of a preamble and/or for the remaining part of a frame. In other configurations, the precoding matrix determination block/module 1021 may determine the precoding matrix or steering matrix 1096 as illustrated in Equations (7) and (8) for an entire preamble and/or for an entire frame.

In yet another configuration, the precoding matrix determination block/module 1021 may determine the precoding matrix or steering matrix 1096 as illustrated in Equations (10), (11), (12), (13) and (14) above. For example, the precoding matrix determination block/module 1021 may determine a matrix of steering vectors, perform additional singular value decompositions, etc.

The access point may use the precoding matrix or steering matrix 1096 to beamform payload data 1004 and/or overhead data 1016. For example, the precoding matrix or steering matrix 1096 may be provided to the one or more transmitters 1026, which may accordingly weight the transmissions on each antenna 1032a-n. The (weighted) transmitted signal may be received by one or more access terminals 1042. For example, data 1004, 1016 for a group of access terminals 1042 may be carried in a beamformed signal to a group of access terminals 1042. Each of the access terminals 1042 may receive the (weighted) transmitted signal using their respective antenna(s) 1036 and receiver(s) 1058. The received signal 1099 may be provided to a spatial filtering/MIMO processing/interference suppression block/module 1029. The spatial filtering/MIMO processing/interference suppression block/module 1029 may perform spatial filtering, MIMO processing and/or some other kind of interference suppression to recover data 1031 for the access terminal 1042.

The access point 1002 may additionally or alternatively use flexible multi-group block diagonalization as described above. For example, assume that for an access terminal 1042 (e.g., client) c in group k, the access point 1002 only gets a beamforming matrix and average signal-to-noise ratio (SNR) per stream, where access terminal 1042 (e.g., client) c obtained the beamforming matrix $V_c''(:,1: N_{ssck})$ through $[U_c'', S_c'', V_c'']=\text{svd}(H_{ck})$, for example, while the other access terminals (e.g., clients) 1042 fed back channel state information $H_{mk}$. In this case, the multi-group communication block/module 1014 may set $H_{ck}$ to $V_c''(:, 1: N_{ssck})^H$ as well as the corresponding part in $H_k$ 1001) as described above. The rest of the processing may be performed the same as the previously described multi-group block diagonalization procedures described. For example, suppose that the procedure illustrated in Listing (1) above is used, then access terminal 1042 (e.g., client) c may apply dedicated spatial filtering by the spatial filtering block/module 1029 to recover its data 1031 as illustrated in Equation (15) above. Alternatively, depending on the MU-MIMO technique used, the spatial filtering/MIMO processing/interference suppression block/module 1029 may do any other type of MIMO processing or interference suppression (assuming that proper channel estimation is done, for example) to recover the data 1031.

Additionally or alternatively, the access point 1002 may use another kind of flexible multi-group block diagonalization. For example, assume that for access terminal 1042 (e.g., client) c in group k, the access point 1002 only gets the beamforming matrix and singular values, where access terminal 1042 (e.g., client) c obtained the beamforming matrix $V_c''(:,1: N_{ssck})$ and singular values $S_c''(1: N_{ssck}, 1: N_{ssck})$ through $[U_c'', S_c'', V_c'']=\text{svd}(H_{ck})$, for example, while the other access terminals (e.g., clients) 1042 fed back the channel state information $H_{mk}$. In this case, the accesspoint 1002 may set $H_{ck}$ to $S_c''(1: N_{ssck}, 1: N_{ssck})V_c''(:, 1: N_{ssck})^H$ (as well as the corresponding part in $H_k$). The rest of the processing may be performed as described above. For example, suppose that the procedure illustrated in Listing (1) above is used, then access terminal 1042 (e.g., client) c may apply dedicated spatial filtering by the spatial filtering block/module 1029 to recover its data 1031 as illustrated in Equation (16) above. Alternatively, depending on the MU-MIMO technique used, the spatial filtering block/module 1029 may do any other type of MIMO processing or interference suppression (assuming that proper channel estimation is done, for example) to recover the data 1031.

It should be noted that a precoding matrix 1096 or steering matrix 1096 may be generated for each group of access terminals 1042 in a number of groups $N_G$. Additionally or alternatively, group precoding matrices 1096 or steering matrices 1096 may be used individually and/or may be combined into a single precoding matrix or steering matrix.

The access point 1002 may optionally use collision protection information 1094 (e.g., media access control protection) to prevent collisions. More specifically, media access control (MAC) protection may be used to prevent collisions from access terminals (e.g., stations) 1042. For example, a separate clear to send (CTS) signal may be sent prior to the downlink MU-MIMO packet. This CTS signal may notify the access terminals 1042 that a particular access terminal 1042 may transmit a signal to the access point 1002. Other access terminals 1042 besides the one designated to send may wait to transmit signals until after a given period.

The access point 1002 may transmit a beamformed signal to each group of access terminals 1042 using the precoding matrix 1096 or steering matrix 1096 for each group. For example, the access point 1002 may transmit a signal or set of signals to each group of access terminals 1042 using each of the group precoding matrices 1096. More specifically, antenna weighting factors from the precoding matrix for each group may be applied to electromagnetic signals that are then radiated from multiple access point 1002 antennas 1032*a-n*.

The access terminal 1042 may receive a group signal. For example, the access terminal 1042 may receive a beamformed signal transmitted from the access point 1002 that includes information for a group of access terminals 1042. This may be done using its one or more antennas 1036*a-n* and one or more receivers 1058. As described above an access terminal 1042 may use spatial filtering or another type of MIMO processing or interference suppression to recover data from the group signal. For example, the spatial filtering/MIMO processing/interference suppression block/module 1029 may perform spatial filtering, MIMO processing and/or some other kind of interference suppression on one or more received signals 1099 to recover data 1031 for the access terminal 1042.

Figure 11:
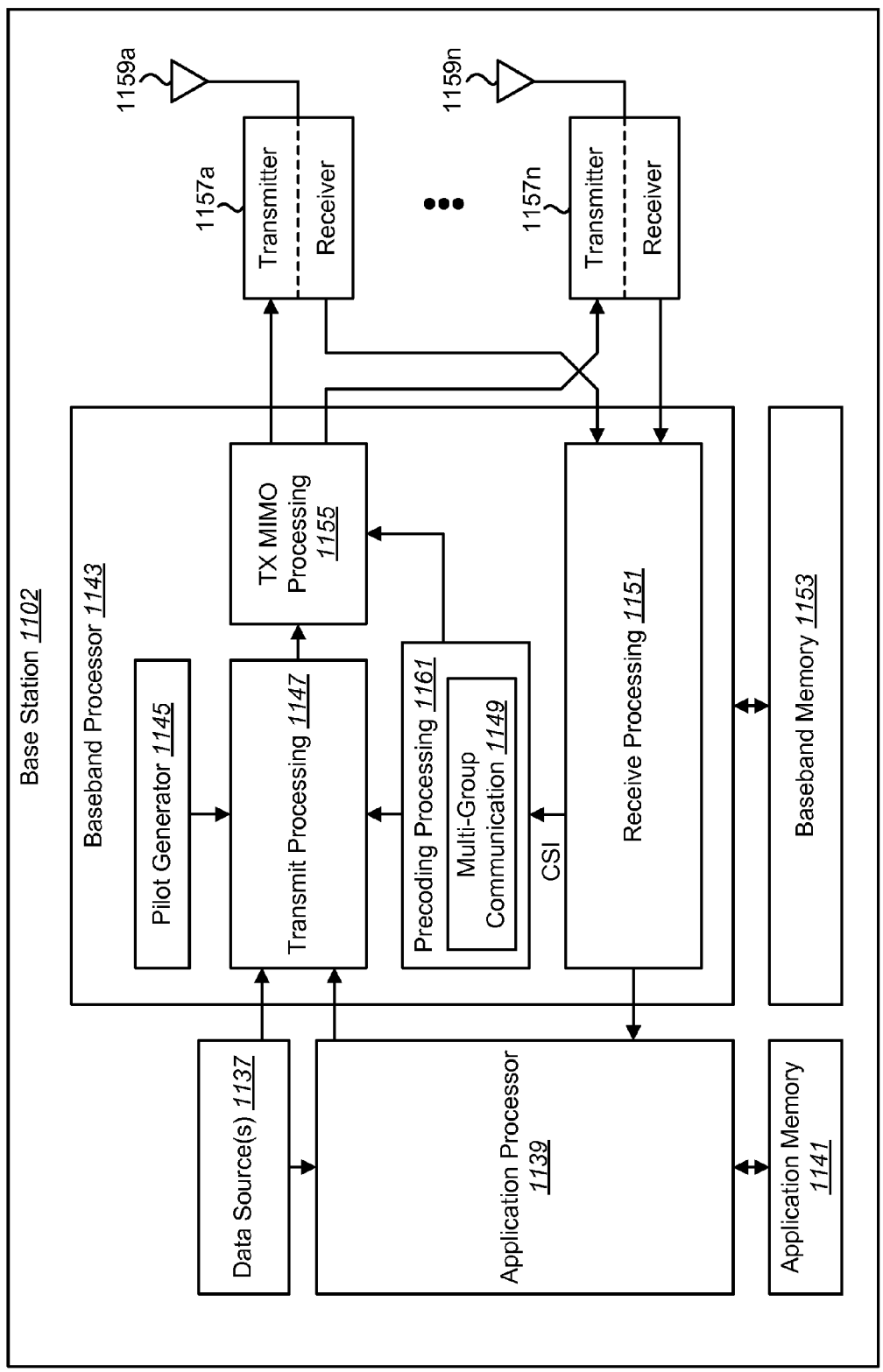
FIG. 11 is a block diagram of a base station that may be used in a multiple-input and multiple-output (MIMO) system.

FIG. 11 is a block diagram of a base station 1102 that may be used in a multiple-input and multiple-output (MIMO) system. Examples of the base station 1102 may include the transmitting communication device 102, the base station 202 and the access point 802 illustrated above. The base station 1102 may be configured similarly to the transmitting communication device 102, the base station 202 and/or the access point 802 illustrated above or vice-versa. In the base station 1102, traffic data for a number of data streams is provided from one or more data sources 1137 and/or an application processor 1139 to a baseband processor 1143. In particular, traffic data may be provided to a transmit processing block/module 1147 included in the baseband processor 1143. Each data stream may then be transmitted over a respective transmit antenna 1159*a-n*. The transmit processing block/module 1147 may format, code and interleave the traffic data for each data stream based on a particular coding scheme selected for that data stream to provide coded data.

The coded data for each data stream may be multiplexed with pilot data from a pilot generator 1145 using orthogonal frequency-division multiplexing (OFDM) techniques. The pilot data may be a known data pattern that is processed in a known manner and used at a receiver to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK), quadrature amplitude modulation (QAM) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processing block/module 1155, which may further process the modulation symbols (e.g., for OFDM). The transmit (TX) multiple-input multiple-output (MIMO) processing block/module 1155 then provides a number of modulation symbol streams to the transmitters 1157*a-n*. The TX transmit (TX) multiple-input multiple-output (MIMO) processing block/module 1155 may apply beamforming weights to the symbols of the data streams and to the antenna 1159 from which the symbol is being transmitted.

Each transmitter 1157 may receive and process a respective symbol stream to provide one or more analog signals, and further condition (e.g., amplify, filter, and upconvert) the analog signals to provide a modulated signal suitable for transmission over the MIMO channel. Modulated signals from the transmitters 1157*a-n* are then respectively transmitted from the antennas 1159*a-n*. For example, the modulated signal may be transmitted to another communication device (not illustrated in FIG. 11).

The base station 1102 may receive modulated signals (from another communication device). These modulated signals are received by antennas 1159 and conditioned by receivers 1157 (e.g., filtered, amplified, downconverted, digitized). In other words, each receiver 1157 may condition (e.g., filter, amplify, and downconvert) a respective received signal, digitize the conditioned signal to provide samples, and further process the samples to provide a corresponding "received" symbol stream.

A receive processing block/module 1151 included in the baseband processor 1143 then receives and processes the received symbol streams from the receivers 1157 based on a particular receiver processing technique to provide a number of "detected" streams. The receive processing block/module 1151 demodulates, deinterleaves and decodes each stream to recover the traffic data for the data stream.

A precoding processing block/module 1161 included in the baseband processor 1143 may receive channel state information (CSI) from the receive processing block/module 1151. The precoding processing block/module 1161 then determines which pre-coding matrix to use for determining the beamforming weights and then processes the extracted message. It should be noted that the baseband processor 1143 may store information on and retrieve information from baseband memory 1153.

The precoding processing block/module 1161 may perform one or more of the methods 300, 600, 700, 800 illustrated above. For example, precoding processing block/module 1161 may include a multi-group communication block/module 1149. The multi-group communication block/module 1149 may execute instructions in order to enable the base station 1102 to communicate with multiple groups of communication devices (e.g., receiving communication devices 142, wireless communication devices 242, access terminals 1042, etc.).

The traffic data recovered by the baseband processor 1143 may be provided to the application processor 1139. The application processor 1139 may store information in and retrieve information from the application memory 1141.

Figure 12:
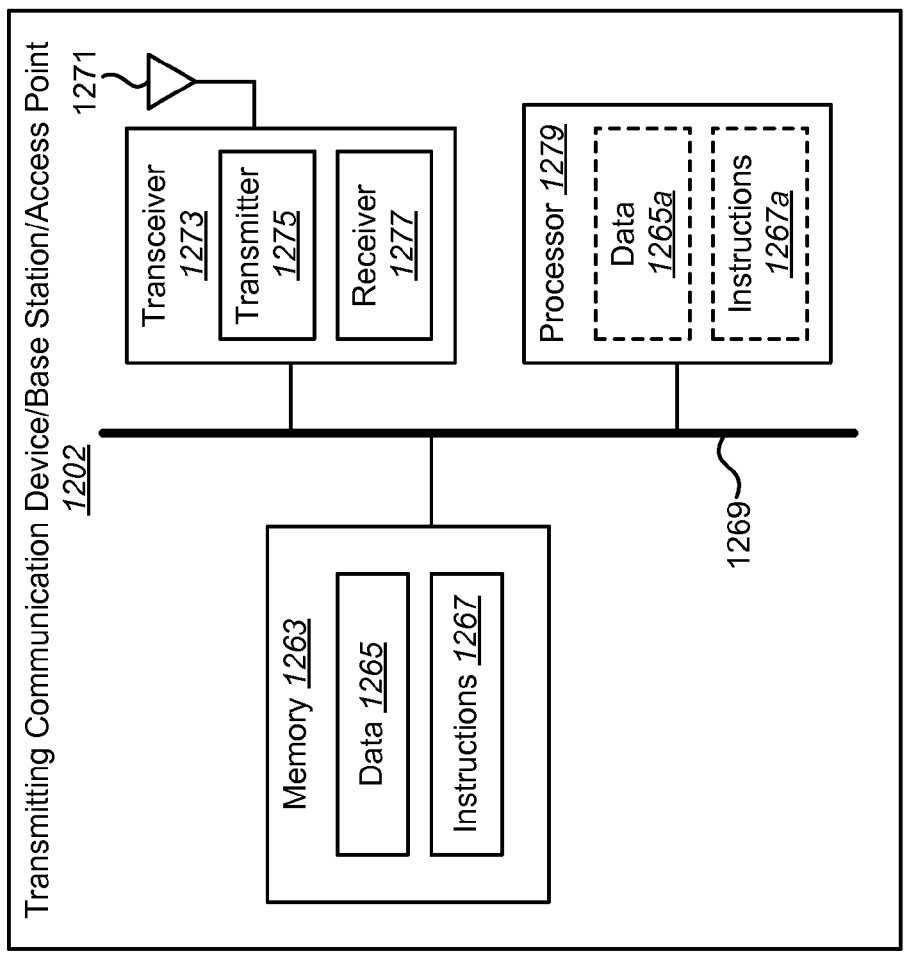
FIG. 12 illustrates certain components that may be included within a transmitting communication device, base station and/or access point.

FIG. 12 illustrates certain components that may be included within a transmitting communication device, base station and/or access point 1202. The transmitting communication device 102, base stations 202, 1102 and/or access point 1002 described above may be configured similarly to the transmitting communication device/base station/access point 1202 that is shown in FIG. 12.

The transmitting communication device/base station/access point 1202 includes a processor 1279. The processor 1279 may be a general purpose single- or multi-chip microprocessor (e.g., an ARM), a special purpose microprocessor (e.g., a digital signal processor (DSP)), a microcontroller, a programmable gate array, etc. The processor 1279 may be referred to as a central processing unit (CPU). Although just a single processor 1279 is shown in the transmitting communication device/base station/access point 1202 of FIG.

12, in an alternative configuration, a combination of processors (e.g., an ARM and DSP) could be used.

The transmitting communication device/base station/access point 1202 also includes memory 1263 in electronic communication with the processor 1279 (i.e., the processor 1279 can read information from and/or write information to the memory 1263). The memory 1263 may be any electronic component capable of storing electronic information. The memory 1263 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1265 and instructions 1267 may be stored in the memory 1263. The instructions 1267 may include one or more programs, routines, sub-routines, functions, procedures, code, etc. The instructions 1267 may include a single computer-readable statement or many computer-readable statements. The instructions 1267 may be executable by the processor 1279 to implement the methods 300, 600, 700, 800 described above. Executing the instructions 1267 may involve the use of the data 1265 that is stored in the memory 1263. FIG. 12 shows some instructions 1267a and data 1265a being loaded into the processor 1279.

The transmitting communication device/base station/access point 1202 may also include a transmitter 1275 and a receiver 1277 to allow transmission and reception of signals between the transmitting communication device/base station/access point 1202 and a remote location (e.g., another transmitting communication device, access terminal, access point, etc.). The transmitter 1275 and receiver 1277 may be collectively referred to as a transceiver 1273. An antenna 1271 may be electrically coupled to the transceiver 1273. The transmitting communication device/base station/access point 1202 may also include (not shown) multiple transmitters, multiple receivers, multiple transceivers and/or multiple antennas.

The various components of the transmitting communication device/base station/access point 1202 may be coupled together by one or more buses, which may include a power bus, a control signal bus, a status signal bus, a data bus, etc. For simplicity, the various buses are illustrated in FIG. 12 as a bus system 1269.

Figure 13:
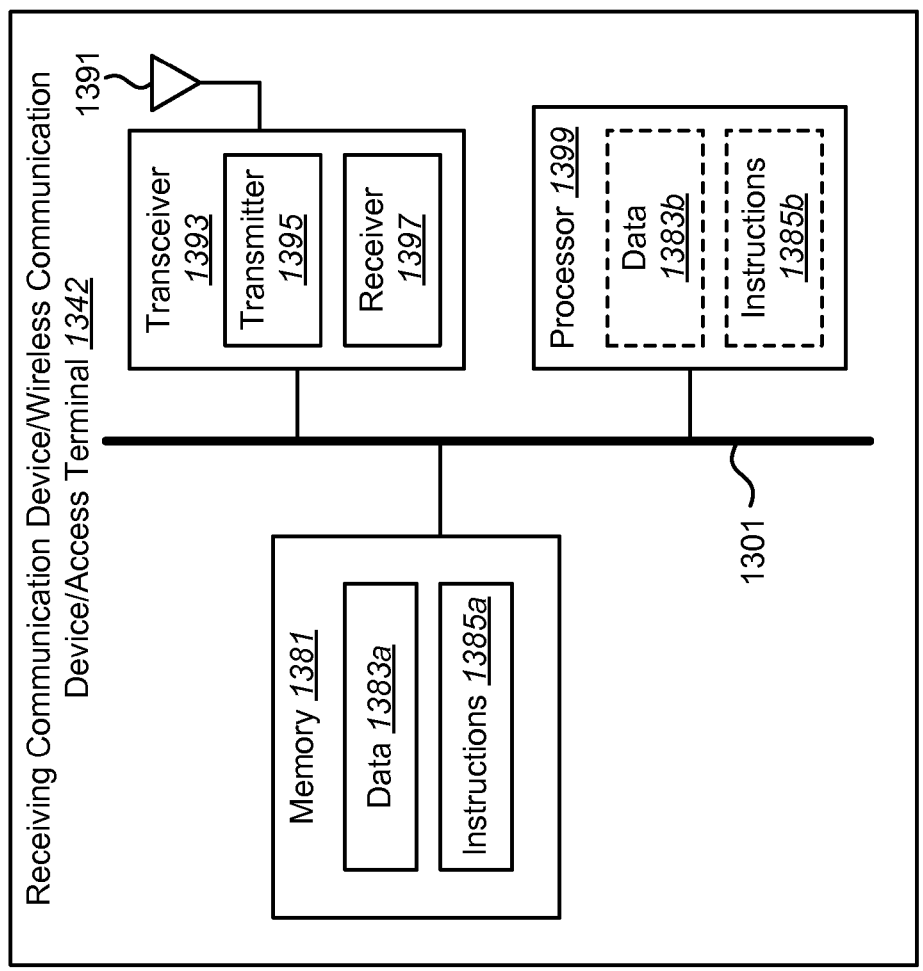
FIG. 13 illustrates certain components that may be included within a receiving communication device, wireless communication device and/or access terminal.

FIG. 13 illustrates certain components that may be included within a receiving communication device, wireless communication device and/or access terminal 1342. One or more of the receiving communication devices 142, wireless communication devices 242 and/or access terminals 1042 described above may be configured similarly to the receiving communication device/wireless communication device/access terminal 1342 that is shown in FIG. 13.

The receiving communication device/wireless communication device/access terminal 1342 includes a processor 1399. The processor 1399 may be a general purpose single- or multi-chip microprocessor (e.g., an ARM), a special purpose microprocessor (e.g., a digital signal processor (DSP)), a microcontroller, a programmable gate array, etc. The processor 1399 may be referred to as a central processing unit (CPU). Although just a single processor 1399 is shown in the receiving communication device/wireless communication device/access terminal 1342 of FIG. 13, in an alternative configuration, a combination of processors 1399 (e.g., an ARM and DSP) could be used.

The receiving communication device/wireless communication device/access terminal 1342 also includes memory 1381 in electronic communication with the processor 1399 (i.e., the processor 1399 can read information from and/or write information to the memory 1381). The memory 1381 may be any electronic component capable of storing electronic information. The memory 1381 may be random access memory (RAM), read-only memory (ROM), magnetic disk storage media, optical storage media, flash memory devices in RAM, on-board memory included with the processor 1399, programmable read-only memory (PROM), erasable programmable read-only memory (EPROM), electrically erasable PROM (EEPROM), registers, and so forth, including combinations thereof.

Data 1383a and instructions 1385a may be stored in the memory 1381. The instructions 1385a may include one or more programs, routines, sub-routines, functions, procedures, code, etc. The instructions 1385a may include a single computer-readable statement or many computer-readable statements. The instructions 1385a may be executable by the processor 1399 to implement the method 900 described above. Executing the instructions 1385a may involve the use of the data 1383a that is stored in the memory 1381. FIG. 13 shows some instructions 1385b and data 1383b being loaded into the processor 1399 (which may come from instructions 1385a and data 1383a in memory 1381).

The receiving communication device/wireless communication device/access terminal 1342 may also include a transmitter 1395 and a receiver 1397 to allow transmission and reception of signals between the receiving communication device/wireless communication device/access terminal 1342 and a remote location (e.g., a communication device, base station, etc.). The transmitter 1395 and receiver 1397 may be collectively referred to as a transceiver 1393. An antenna 1391 may be electrically coupled to the transceiver 1393. The receiving communication device/wireless communication device/access terminal 1342 may also include (not shown) multiple transmitters 1395, multiple receivers 1397, multiple transceivers 1393 and/or multiple antennas 1391.

In some configurations, the receiving communication device/wireless communication device/access terminal 1342 may include one or more microphones for capturing acoustic signals. In one configuration, a microphone may be a transducer that converts acoustic signals (e.g., voice, speech) into electrical or electronic signals. Additionally or alternatively, the receiving communication device/wireless communication device/access terminal 1342 may include one or more speakers. In one configuration, a speaker may be a transducer that converts electrical or electronic signals into acoustic signals.

The various components of the receiving communication device/wireless communication device/access terminal 1342 may be coupled together by one or more buses, which may include a power bus, a control signal bus, a status signal bus, a data bus, etc. For simplicity, the various buses are illustrated in FIG. 13 as a bus system 1301.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A base station for communicating with multiple groups of wireless communication devices, comprising:
a plurality of antennas;
a processor;
memory in electronic communication with the processor;
instructions stored in the memory, the instructions being executable to:
determine a number of wireless communication devices;
send multiple channel state information requests to a same wireless communication device, wherein each of the multiple channel state information requests is sent using a subset of the plurality of antennas, and wherein each subset comprises more than one antenna and at least one common antenna;
receive multiple channel state information messages from the same wireless communication device;
combine the multiple channel state information messages;
split the number of wireless communication devices into groups based on the combined channel state information messages;
determine a precoding matrix for each group; and
transmit a beamformed signal to each group using the precoding matrix for each group.

2. The base station of claim 1, wherein combining the multiple channel state information messages comprises normalizing all channels by channel values for the at least one common antenna.

3. A wireless communication device for receiving a group signal, comprising:
a processor;
memory in electronic communication with the processor;
instructions stored in the memory, the instructions being executable to:
receive a plurality of channel information requests from a base station;
determine channel information for each of the channel information requests;
send the channel information to the base station;
receive a group signal, wherein the group signal includes information for two or more wireless communication devices; and
recover data for the wireless communication device from the group signal using spatial filtering.

4. The wireless communication device of claim 3, wherein the instructions are further executable to receive a clear to send (CTS) signal and wait a predetermined amount of time before transmitting a signal.

5. The wireless communication device of claim 3, wherein the data is recovered using spatial filtering according to an equation $U_c^H S_c''^{-1}(1:N_{ssck}, 1:N_{ssck})*U_c''^H$, wherein $U_c$ is $U_m$ that includes left singular vectors of $H_{mk}V_n$ for the wireless communication device m=c, $H_{mk}$ is a client channel, $V_n$ is a complement group channel null space, $S''_c$ are singular values of $H_{ck}$, $H_{ck}$ is a channel for the wireless communication device c, $N_{ssck}$ is a number of spatial streams for the wireless communication device c in group k, $U''_c$ includes left singular vectors of $H_{ck}$ and superscript $H$ denotes a conjugate transpose.

6. The wireless communication device of claim 3, wherein the data is recovered using spatial filtering according to an equation $U_c^H * U_c''^H$, wherein $U_c$ is $U_m$ that includes left singular vectors of $H_{mk}V_n$ for the wireless communication device m=c, $H_{mk}$ is a client channel, $V_n$ is a complement group channel null space, $U_c''$ includes left singular vectors of $H_{ck}$, $H_{ck}$ is a channel for the wireless communication device c and superscript $H$ denotes a conjugate transpose.

7. A method for receiving a group signal by a wireless communication device, comprising:
receiving a plurality of channel information requests from a base station;
determining channel information for each of the channel information requests;
sending the channel information to the base station;
receiving a group signal, wherein the group signal includes information for two or more wireless communication devices; and recovering data for the wireless communication device from the group signal using spatial filtering.

8. The method of claim 7, further comprising receiving a clear to send (CTS) signal and waiting a predetermined amount of time before transmitting a signal.

9. The method of claim 7, wherein the data is recovered using spatial filtering according to an equation $U_c^H S_c^{"-1}(1:N_{ssck}, 1:N_{ssck})*U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $S"_c$ are singular values of $H_{ck}$, $H_{ck}$ is a channel for the wireless communication device c, $N_{ssck}$ is a number of spatial streams for the wireless communication device c in group k, $U_c"$ includes left singular vectors of $H_{ck}$ and superscript $^H$ denotes a conjugate transpose.

10. The method of claim 7, wherein the data is recovered using spatial filtering according to an equation $U_c H * U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $U_c"$ includes left singular vectors of $H_{ck}$ and superscript $^H$ denotes a conjugate transpose.

11. A computer-program product for receiving a group signal, comprising a non-transitory tangible computer-readable medium having instructions thereon, the instructions comprising:
    code for causing a wireless communication device to receive a plurality of channel information requests from a base station;
    code for causing the wireless communication device to determine channel information for each of the channel information requests;
    code for causing the wireless communication device to send the channel information to the base station;
    code for causing the wireless communication device to receive a group signal, wherein the group signal includes information for two or more wireless communication devices; and
    code for causing the wireless communication device to recover data for the wireless communication device from the group signal using spatial filtering.

12. The computer-program product of claim 11, wherein the data is recovered using spatial filtering according to an equation $U_c^H S_c^{"-1}(1:N_{ssck}, 1:N_{ssck})*U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $S_c"$ are singular values of $H_{ck}$, $H_{ck}$ is a channel for the wireless communication device c, $N_{ssck}$ is a number of spatial streams for the wireless communication device c in group k, $U_c"$ includes left singular vectors of $H_{ck}$ and superscript $^H$ denotes a conjugate transpose.

13. The computer-program product of claim 11, wherein the data is recovered using spatial filtering according to an equation $U_c^H * U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $U_c"$ includes left singular vectors of $H_{ck}$ and superscript $^H$ denotes a conjugate transpose.

14. An apparatus for receiving a group signal, comprising:
    means for receiving a plurality of channel information requests from a base station;
    means for determining channel information for each of the channel information requests;
    means for sending the channel information to the base station;
    means for receiving a group signal, wherein the group signal includes information for two or more wireless communication devices; and
    means for recovering data for a wireless communication device from the group signal using spatial filtering.

15. The apparatus of claim 14, wherein the data is recovered using spatial filtering according to an equation $U_c^H S_c^{"-1}(1:N_{ssck}, 1:N_{ssck})*U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $S_c"$ are singular values of $H_{ck}$, $H_{ck}$ is a channel for the wireless communication device c, $N_{ssck}$ is a number of spatial streams for the wireless communication device c in group k, $U_c"$ includes left singular vectors of $H_{ck}$ and superscript $^H$ denotes a conjugate transpose.

16. The apparatus of claim 14, wherein the data is recovered using spatial filtering according to an equation $U_c^H * U_c^{"H}$, wherein $U_c$ is $U_m$ that includes left singular vectors of $H_{mk}V_n$ for the wireless communication device m=c, $H_{mk}$ is a client channel, $V_n$ is a complement group channel null space, $U_c"$ includes left singular vectors of $H_{ck}$, $H_{ck}$ is a channel for the wireless communication device c and superscript $^H$ denotes a conjugate transpose.

* * * * *